(12) United States Patent
Daikoku

(10) Patent No.: US 8,333,626 B2
(45) Date of Patent: Dec. 18, 2012

(54) HYBRID OUTBOARD MOTOR

(75) Inventor: Keisuke Daikoku, Shizuoka (JP)

(73) Assignee: Suzuki Motor Corporation, Tokyo (JP)

( * ) Notice: Subject to any disclaimer, the term of this patent is extended or adjusted under 35 U.S.C. 154(b) by 259 days.

(21) Appl. No.: 12/731,495

(22) Filed: Mar. 25, 2010

(65) Prior Publication Data

US 2010/0248562 A1 Sep. 30, 2010

(30) Foreign Application Priority Data

Mar. 26, 2009 (JP) ................................. 2009-077385
Mar. 26, 2009 (JP) ................................. 2009-077412

(51) Int. Cl.
*B63H 21/20* (2006.01)
*B60L 11/00* (2006.01)
*B63H 21/17* (2006.01)
*B63H 20/32* (2006.01)
*B63H 21/36* (2006.01)

(52) U.S. Cl. .................................. 440/3; 440/6; 440/76

(58) Field of Classification Search .................. 440/3, 6, 440/49, 53, 76, 77
See application file for complete search history.

(56) References Cited

U.S. PATENT DOCUMENTS

| 7,300,322 | B2 * | 11/2007 | Kitani et al. ...................... 440/6 |
| 7,322,866 | B2 * | 1/2008 | Shiomi et al. .................. 440/76 |
| 7,530,864 | B2 | 5/2009 | Kaji | |

FOREIGN PATENT DOCUMENTS

| JP | 2006-36086 A | 2/2006 |
| JP | 2008-137646 A | 6/2008 |

* cited by examiner

*Primary Examiner* — Daniel Venne
(74) *Attorney, Agent, or Firm* — Troutman Sanders LLP

(57) ABSTRACT

A power unit is housed in a casing, and a screw (propeller) is disposed outside the casing, the screw being driven by the power unit. The casing is formed as a watertight case in a substantially rectangular parallelepiped shape with a left-right width direction being a longitudinal direction, and the case has at least a front face portion coupled to a stern portion and a substantially flat upper face portion at a substantially same height as a top portion of the stern portion.

7 Claims, 34 Drawing Sheets

F I G. 10
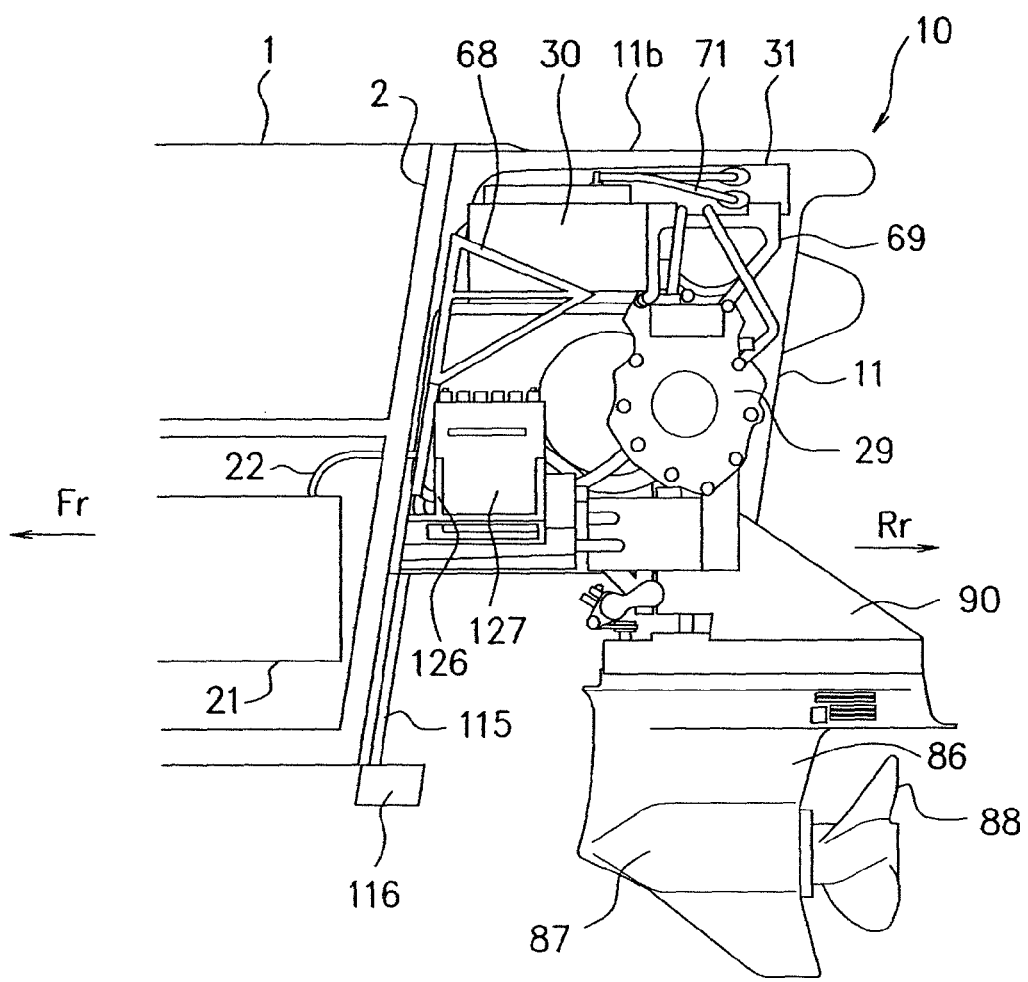

F I G. 18B
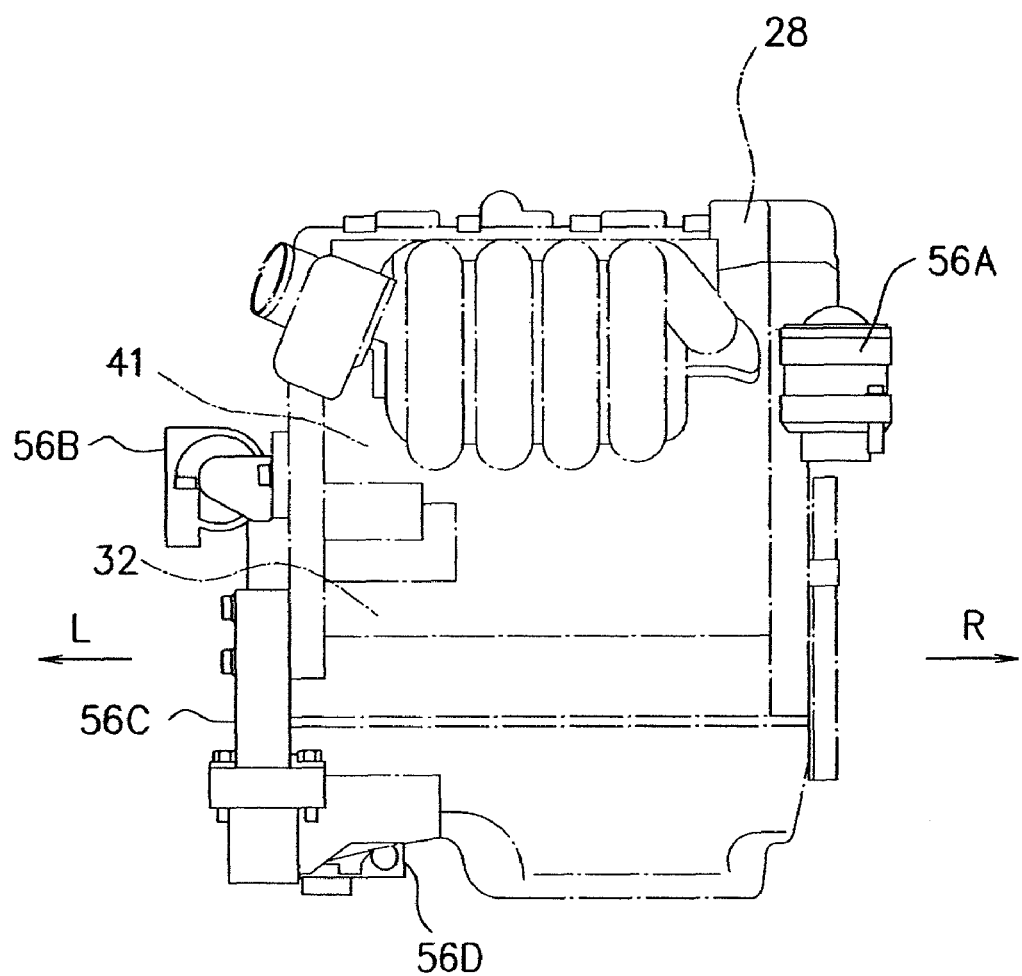

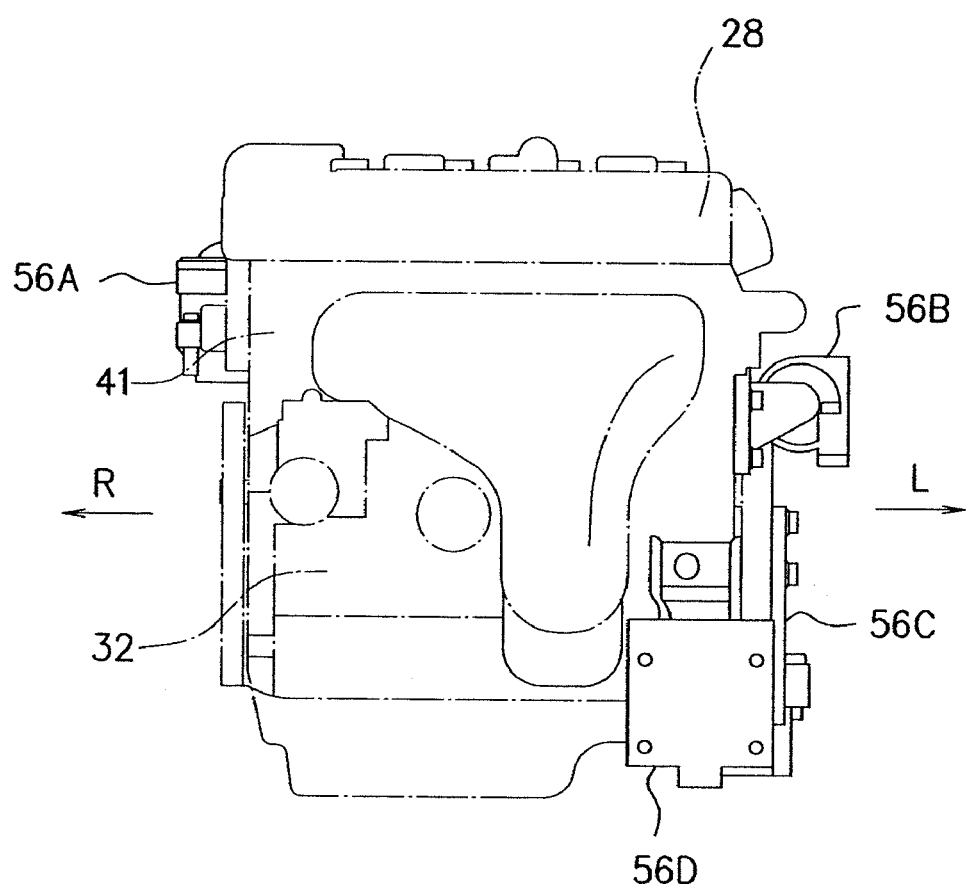
F I G. 18C

F I G. 18D
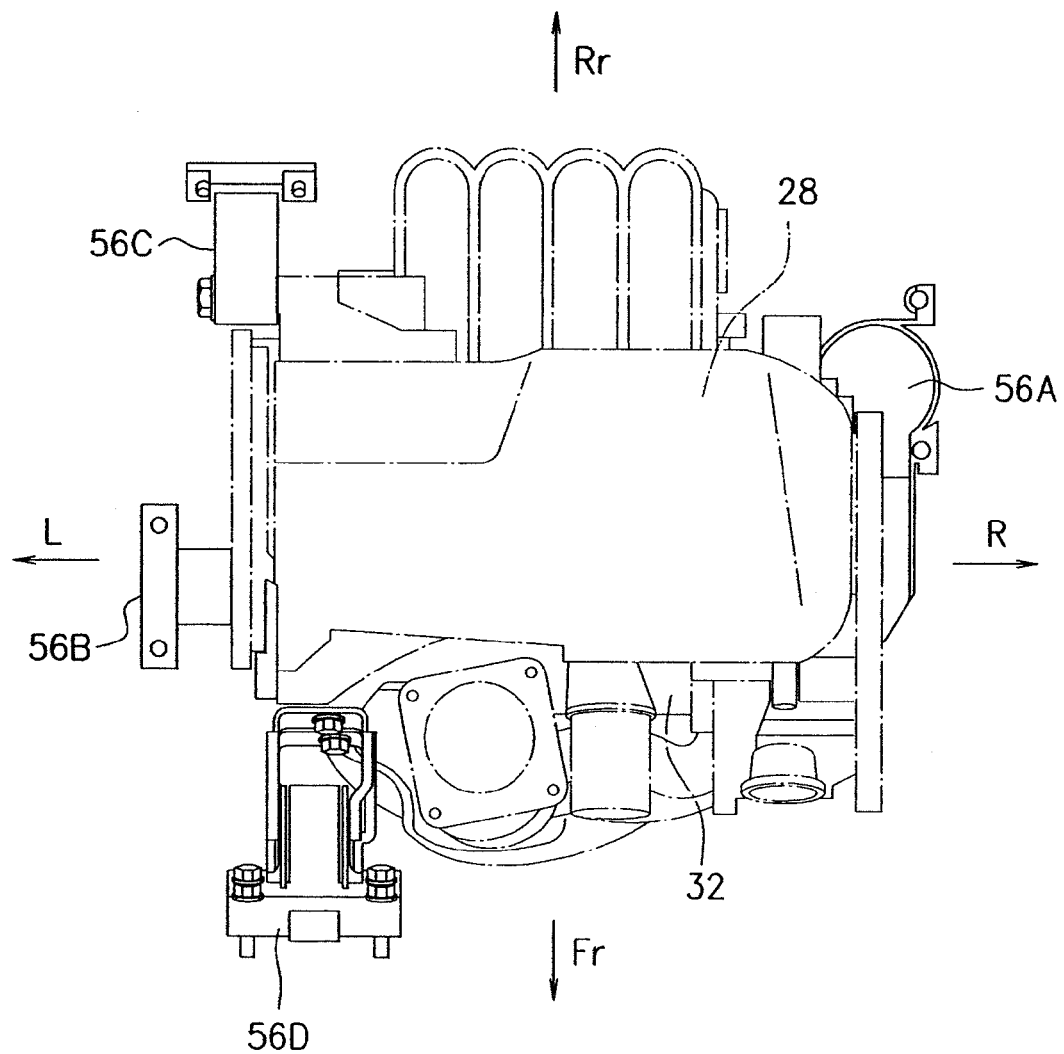

F I G. 23
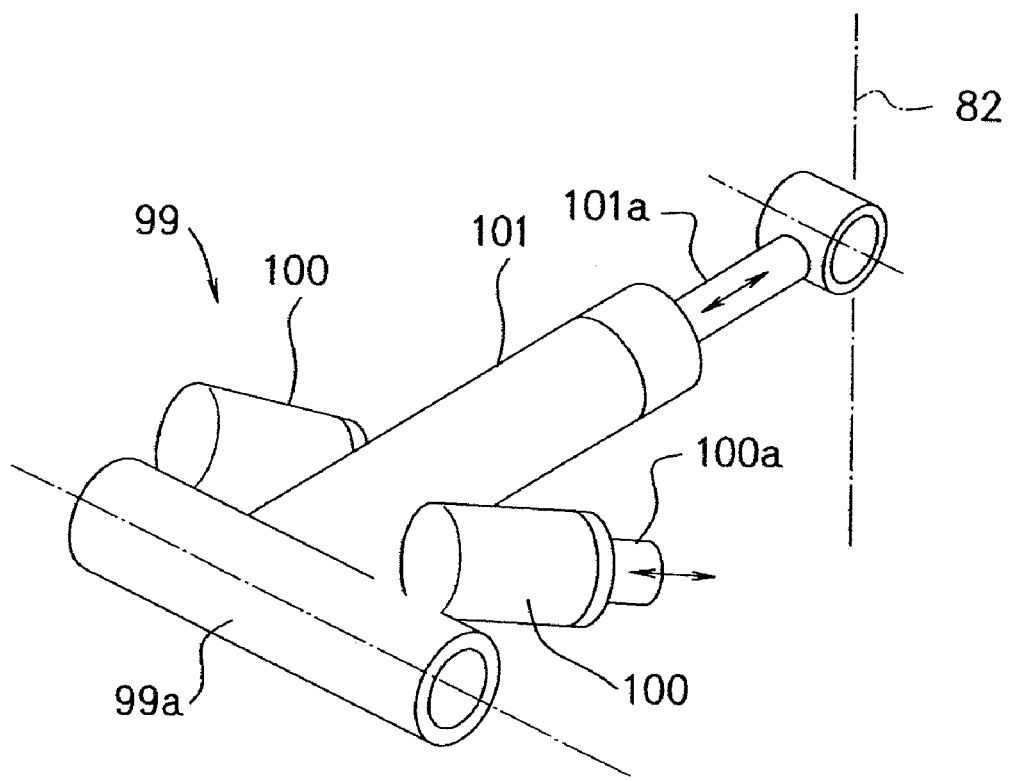

F I G. 33A
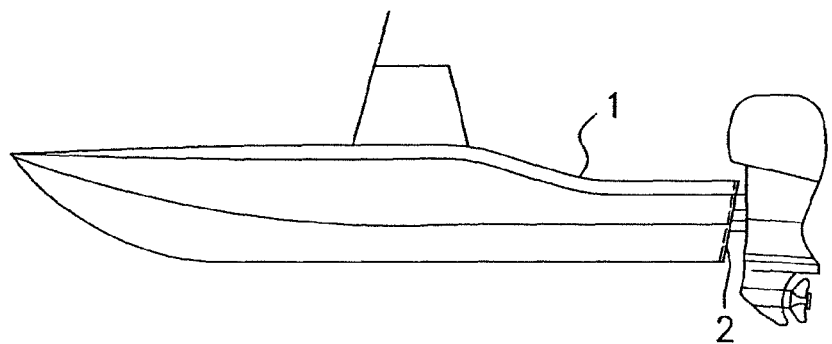
F I G. 33B
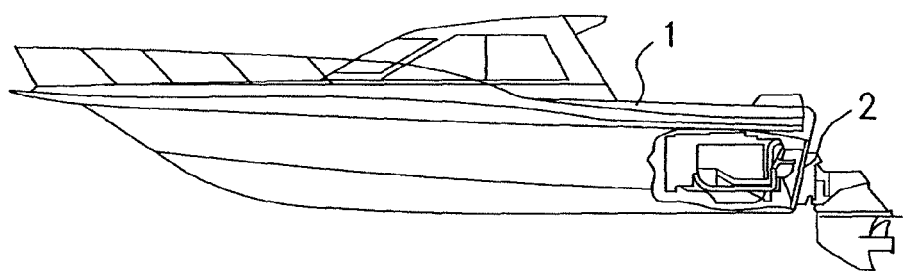
F I G. 33C
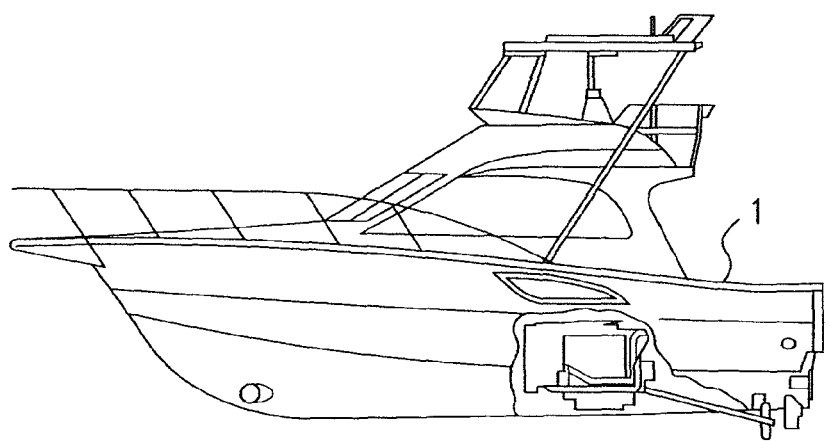

HYBRID OUTBOARD MOTOR

CROSS-REFERENCE TO RELATED APPLICATIONS

This application is based upon and claims the benefit of priority of the prior Japanese Patent Application Nos. 2009-077385, filed on Mar. 26, 2009, and 2009-077412, filed on Mar. 26, 2009, the entire contents of which are incorporated herein by reference.

BACKGROUND OF THE INVENTION

1. Field of the Invention

The present invention relates to an outboard motor (hybrid outboard motor) having a power unit (hybrid engine) including an internal combustion engine and a motor generator (serving both as an electric motor and a generator).

2. Description of the Related Art

Major types of propulsion unit or propulsion system for craft or boat include outboard motor, inboard-outdrive motor, inboard motor, and the like. The outboard motor, also called outboard drive or the like as illustrated in FIG. 33A, is integrally made up of an engine, auxiliary machines, gears and shafts of a drive system, a screw, and so on, and is mounted onto a transom board 2 of the stern of a hull 1. Typically mounted on a small boat or the like, the outboard motor can change in direction about an axis (steering function), and is also structured to be capable of being flipped up to avoid collision against an obstacle or the like while traveling (tilting function).

Further, the inboard-outdrive motor, also called inboard engine/outboard drive or the like as an installation method for a propulsion unit of a small craft or the like as illustrated in FIG. 33B, has an engine mounted in an inboard stern portion and a drive unit made up integrally of reduction gears, a forward and reverse clutch, a propeller, and so on and disposed on the exterior of the transom board 2.

Furthermore, the inboard motor is one of installation methods typically for a propulsion unit of a small craft or the like, as illustrated in FIG. 33C. Also called inboard drive, it is a method placing an engine, reduction gears, and a forward and reverse clutch in an inboard central portion or the like, extending a propeller shaft toward the stern, and placing the propeller under water from a craft bottom. A rudder determining the traveling direction of the boat is often placed behind the propeller. The engine is often a four-stroke diesel engine. Cooling methods for the engine include a direct water cooling method directly circulating water from the water area where the boat is used in a cylinder block and an indirect cooling method circulating clear water in the cylinder block, which is cooled in a heat exchanger by water from the water area where the boat is used, and the like.

Further, there is also known an electric motor-driven type outboard motor using an electric motor as a power source, which is structured integrally with auxiliary machines, gears and shafts of a drive system, a screw, and so on, to be mounted on a transom board of the stern of a hull.

Moreover, as described in Japanese Laid-open Patent Publication No. 2006-36086 or Japanese Laid-open Patent Publication No. 2008-137646, there is what is called a hybrid outboard motor, including an engine and an electric motor as a drive source for a propeller. The hybrid outboard motor described in Japanese Laid-open Patent Publication No. 2006-36086 or Japanese Laid-open Patent Publication No. 2008-137646 has an engine placed to have a crank shaft arranged along an upward and downward direction, and an electric motor disposed below this engine.

Particularly regarding the outboard motor, problems of conventional arts are considered. First, it is mounted in a form covering the stern (transom board), and thus the vicinity of the stern becomes a dead space, that is, it has a practical problem of not allowing boarding/getting off or the like using this space. Further, the outboard motor mounted onto the stern becomes an obstacle. Thus, a net, a caught fish or the like cannot be taking in via the stern, and pulling a rescued person into the boat is practically difficult.

Further, it is formed of a body completely separated from the boat hull, and it is quite difficult to match colors and shapes in the design of the hull and the design of the outboard motor.

Here, problems in packaging of conventional outboard motors are considered in relation with the inboard motor or the inboard-outdrive motor as other packaging methods.

The inboard motor has a propeller shaft, a propeller, a rudder, and the like projecting from the boat bottom which generate large fluid resistance, resulting in poor cruising performance and fuel efficiency. With the inboard motor in which the propeller shaft, the propeller, the rudder, and the like project from the boat bottom, it is not possible to cruise in a shallow sea area. When collided against a floating object on the water, the inboard motor can be damaged to a great extent because no shock absorbing mechanism is provided in itself. Incidentally, the same applies to those inboard motors having a latest propulsion unit called POD.

In both the inboard motor and the inboard-outdrive motor, since an engine is disposed in the hull and a propulsion unit is disposed on the exterior of the hull, it is laborsome to fit the engine in a small closed space, match axial centers of the engine and the propulsion unit, watertight sealing of a coupling portion of the engine and the propulsion unit, or the like. Further, since the engine is located inside the hull or in a deep position in the hull, maintenance is also laborsome.

The inboard-outdrive motor, since it is provided with a tilt mechanism, has a shock absorbing ability, but the tilt axis fulcrum is provided only in the vicinity of a drive shaft coupling the engine and the propulsion unit. Thus, the height of the gear case when tilted at a maximum position is low, and it is practically difficult to be pulled up above the water. Further, since the drive shaft is bent by a universal joint or the like, the tilt angle is small. Accordingly, when kept on the water, the propulsion unit cannot be in a dry state, and it is difficult to ensure corrosion resistance. Further, in the inboard-outdrive motor, steering is performed by bending the drive shaft with a universal joint or the like. Thus, the motor has a small steering angle which results in poor turning performance.

In the inboard-outdrive motor, the engine drive shaft and the propulsion unit drive shaft are mechanically coupled, and thus relative positions of them are limited. Therefore, adjustment to an optimum propelling axis (propeller) position, which is determined by a boat shape, an operating condition, and the like, is not possible.

Further, since the engine drive shaft and the propulsion unit drive shaft are mechanically coupled in the inboard-outdrive motor, relative positions of them vary. Accordingly, the drive shaft coupling them and an exhaust passage are each covered by a bellows-shaped rubber tube to have a watertight structure. Such a tube needs to have plasticity, heat resistance, and weather resistance at the same time which are contradicting requirements, and thus often has a water leak. Thus, regular replacement of parts is required.

Next, fuel efficiency of the conventional outboard motor is considered in relation with a hybrid structure.

When a motor is placed right below a vertical axis engine (in the upward and downward direction) as a characteristic of the outboard motor (parallel hybrid system), the motor is sandwiched by the engine and an oil pan, and this lowers oil dripping performance of the engine. Further, the motor obstructs an exhaust passage of the engine, a cooling water passage of the engine, and a lubricating oil passage of the engine, posing difficulties in engine cooling, lubrication, and exhaust processing. Moreover, since the motor is surrounded by the engine, engine exhaust, and heat of the oil pan, it is difficult to cool the motor, and thus performance of the motor cannot be increased. Unspring weight increases and thus a steering driving force, a shock absorbing device, an engine suspension device, and an engine vibration damping device become large, resulting in increase in all of the size, weight and cost as the whole.

When the engine and the motor are placed in a gear case, in the parallel hybrid system the gear case becomes large, which increases its fluid resistance and worsens cruising performance and fuel efficiency. Unspring weight and the inertial mass around the tilt axis increase and thus a steering driving force, a shock absorbing device, an engine suspension device, and an engine vibration damping device become large, leading to increase in size, weight, and cost as the whole.

Further, when the engine is placed at a position as is conventional and the motor is placed in the gear case (parallel hybrid system), the gear case becomes large since the motor is located in the gear case, which increases its fluid resistance and worsens cruising performance and fuel efficiency. When a speed reducer is provided between the motor and the propeller to optimize efficiency of each of them, the gear case further becomes large, which further worsens cruising performance and fuel efficiency. Further, since there is a large distance between the motor and the engine, a delay and/or a mechanical loss occur when restart of the engine is performed by the driving motor accompanying stopping of idling, which is a fuel efficiency improving feature of the hybrid system. Unspring weight and the inertial mass around the tilt axis increase and thus a steering driving force, a shock absorbing device, an engine suspension device, and an engine vibration damping device become large, leading to increase in size, weight, and cost as the whole.

When the engine is placed at a position as is conventional, a generator is placed right below the engine, and the motor is placed in a gear case (series hybrid system), the generator is sandwiched by the engine and an oil pan, and this lowers oil dripping performance of the engine. Further, the generator obstructs an exhaust passage of the engine, a cooling water passage of the engine, and a lubricating oil passage of the engine, posing difficulties in engine cooling, lubrication, and exhaust processing. Moreover, since the generator is surrounded by the engine, engine exhaust, and heat of the oil pan, it is difficult to cool the generator, and thus performance of the generator cannot be increased. Since the motor is located in the gear case, the gear case becomes large, which increases its fluid resistance and worsens cruising performance and fuel efficiency.

When a speed reducer is provided between the each of them, the gear case further becomes large, which further worsens cruising performance and fuel efficiency. Unspring weight and the inertial mass around the tilt axis increase significantly and thus a steering driving force, a shock absorbing device, an engine suspension device, and an engine vibration damping device become large, leading to increase in size, weight, and cost as the whole.

Further, the case of adding an engine generator to a conventional pure electric outboard motor (series hybrid system) is considered.

The pure electric outboard motor has a small battery capacity and generally has a short cruising distance. When an engine generator is placed in a separate location (for example in a hull) to solve this, energy loss is large when current flows in and out of a battery (or an equivalent energy storage device), yielding quite low efficiency such that the total efficiency of generator, battery, and motor=generator efficiency× battery charging efficiency×battery discharging efficiency× motor efficiency.

Particularly, it has not been easy to arrange and structure plural devices and units favorably and effectively in a limited space in relation to achieving compactness, high performance, and the like.

SUMMARY OF THE INVENTION

The present invention is made in view of such a situation, and an object thereof is to provide a hybrid outboard motor which is itself compact and has a novel structure which can be mounted onto a boat integrally and compactly. Furthermore, there is provided a hybrid outboard motor capable of exhibiting various excellent operations and effects when mounted on a boat to solve the above-described conventional problems or the like.

Particularly, there is provided a hybrid outboard motor in which plural devices and units can be disposed and arranged favorably and effectively in a limited space while achieving compactness, high performance, and the like.

A hybrid outboard motor according to the present invention includes a casing, a power unit housed in the casing, and a screw disposed outside the casing, the screw being driven by the power unit, in which the casing is formed as a watertight case in a substantially rectangular parallelepiped shape with a left-right width direction being a longitudinal direction, and the case has at least a front face portion coupled to a stern portion and a substantially flat upper face portion at a substantially same height as a top portion of the stern portion.

Further, in the hybrid outboard motor according to the present invention, the upper face portion of the case is formed as a cover that is openable/closable with respect to a casing body and is provided with a seal member which keeps the casing body and the cover watertight along closed portions thereof when closed.

The hybrid outboard motor according to the present invention further includes a recessed portion which is provided in a middle portion in a beam direction of the casing and lower than the upper face portion and is formed forward from a rear face of the casing; and a propulsion unit including the screw and disposed in the recessed portion.

Further, in the hybrid outboard motor according to the present invention, a bottom face of the casing is set higher than at least a bottom surface of a hull.

Moreover, a boat according to the present invention includes a stern board or an equivalent portion or member on a stern, and the above-described outboard motor mounted on the stern board or the equivalent portion or member.

Furthermore, the hybrid outboard motor according to the present invention includes a casing formed in a substantially rectangular parallelepiped shape with a left-right width direction being a longitudinal direction; a power unit housed in the casing; a screw disposed outside the casing, the screw being driven by the power unit; an internal combustion engine; an electric motor serving also as a generator; and an electric energy storage device for driving the electric motor, one or both of the internal combustion engine and the electric motor constitute the power unit, the internal combustion engine is disposed on one of the left and right sides of the casing, and the electric motor and the electric energy storage device are disposed on the other side of the left and right sides of the casing.

Further, in the hybrid outboard motor according to the present invention, an inverter connected between the electric motor and the electric energy storage device is disposed at a substantially middle in the beam direction of the casing.

Further, in the hybrid outboard motor according to the invention, a crank shaft of the internal combustion engine and an input shaft of the electric motor are disposed substantially along the beam direction.

BRIEF DESCRIPTION OF THE DRAWINGS

FIG. 10 is a left side view of the power unit housed in the outboard motor casing in the embodiment of the present invention;

FIG. 18B is a view illustrating the structure example of the engine mounts in the power unit housed in the outboard motor casing according to the present invention;

FIG. 18C is a view illustrating the structure example of the engine mounts in the power unit housed in the outboard motor casing according to the present invention;

FIG. 18D is a view illustrating the structure example of the engine mounts in the power unit housed in the outboard motor casing according to the present invention;

FIG. 23 is a perspective view schematically illustrating an example of a power trim tilt used for a tilt mechanism in the embodiment of the present invention;

FIGS. 33A to 33C are views illustrating typical examples of boats on which an outboard motor, an inboard-outdrive motor, and an inboard motor are mounted, respectively.

DETAILED DESCRIPTION OF THE PREFERRED EMBODIMENTS

Hereinafter, a preferred embodiment of a hybrid outboard motor according to the present invention will be described based on the drawings.

Figure 1A:
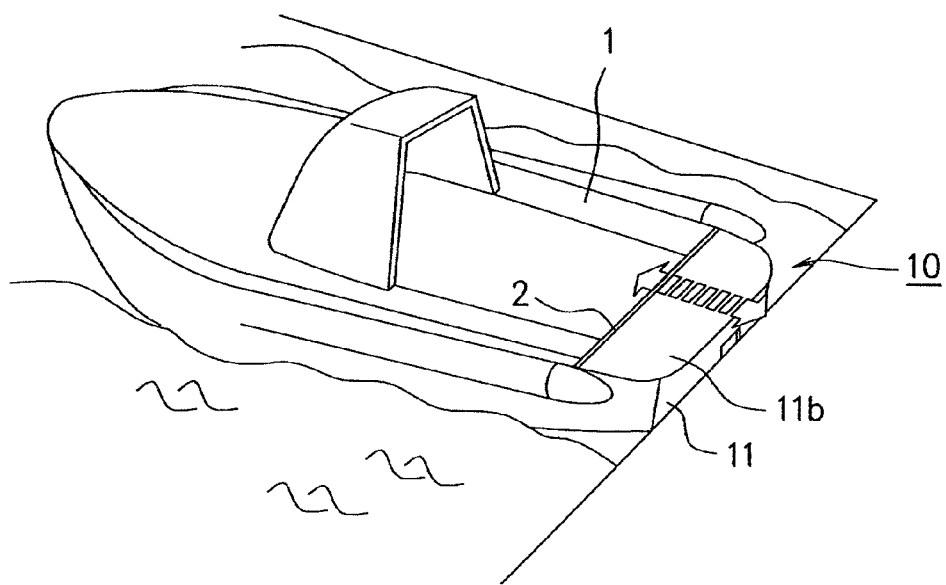
FIGS. 1A and 1B are perspective views illustrating a state that a hybrid outboard motor according to an embodiment of the present invention is mounted on a boat.
Figure 1B:
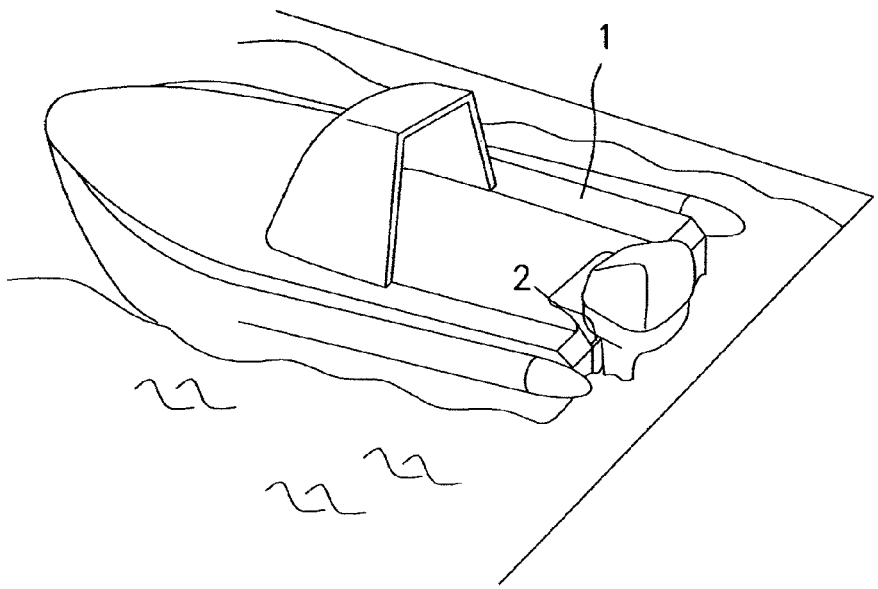
Figure 2:
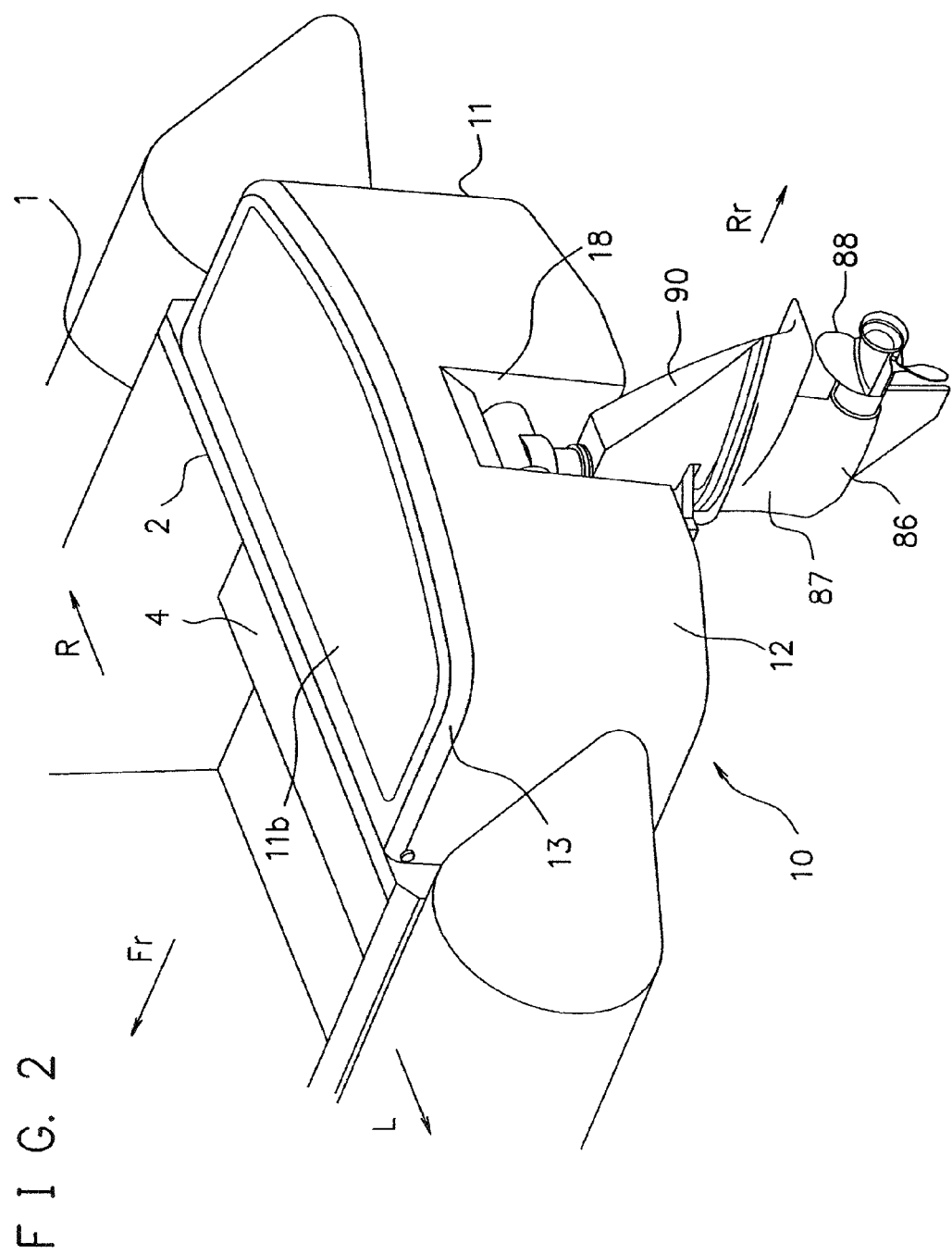
FIG. 2 is a perspective view illustrating the vicinity of the stern of the boat on which the hybrid outboard motor according to the embodiment of the present invention is mounted.

FIGS. 1A and 1B and FIG. 2 illustrate an example of a craft or boat in which a hybrid outboard motor 10 according to the present invention is mounted. In this example, the craft is typically a middle or small sized one, and has a transom board 2 (stern board) at a rear part of a hull 1. The outboard motor 10 is mounted using the transom board 2 as illustrated. Note that in substantial parts of the drawings to be referred to below, the front (bow side) is indicated by arrow Fr, and the rear (stern side) is indicated by arrow Rr. Further, left and right directions of the hull (hull width directions) are indicated by arrow L and arrow R, respectively as necessary.

Figure 3:
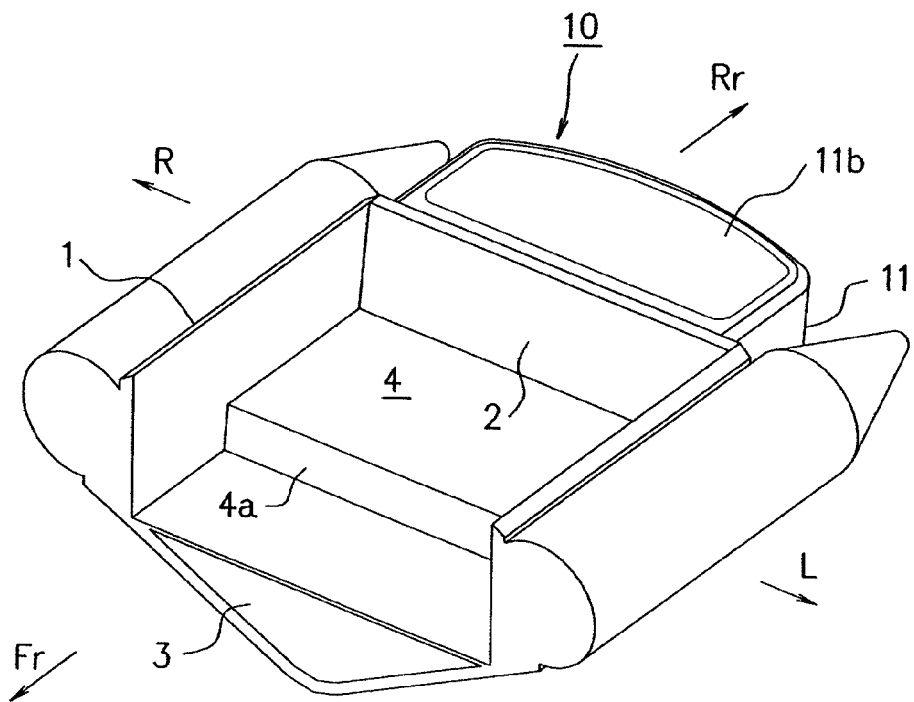
FIG. 3 is a cross-sectional perspective view illustrating the vicinity of the stern of the boat on which the hybrid outboard motor according to the embodiment of the present invention is mounted.

Here, first in the hull 1 according to this embodiment, as in FIG. 3, a boat floor 4 is provided above a boat bottom 3 of the hull 1, and a step portion 4a is provided on this boat floor 4 at a front position of the transom board 2. Note that the craft is not limited to that of the illustrated example, and besides there are hulls having brackets or the like for mounting an outboard motor on a rear side of the stern board. That is, the hybrid outboard motor 10 of the present invention can be effectively applied also to a type having a stern board or an equivalent portion or member on the stern of a hull.

Casing

Figure 4:
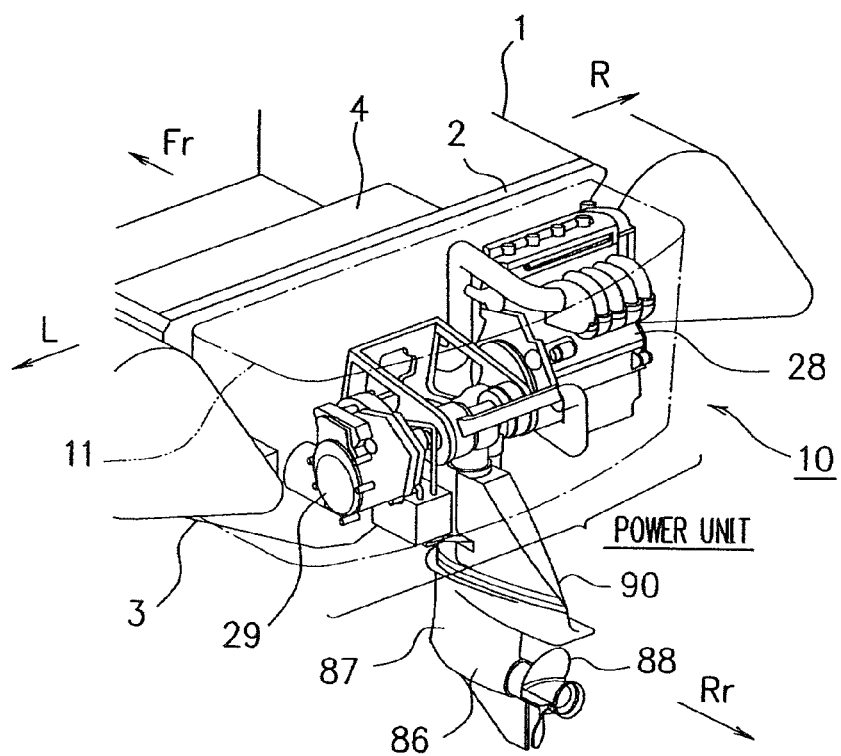
FIG. 4 is a perspective view illustrating a power unit housed in the hybrid outboard motor according to the embodiment of the present invention.

The hybrid outboard motor 10 has a casing 11, and a power unit which will be described later is housed in the casing 11 as in FIG. 4. A screw (propeller) is disposed on an outside of the casing 11, and the screw is rotary driven by the power unit. The casing 11 also functions as an exterior member constituting an appearance of the outboard motor 10, and exhibits a solid appearance as the whole.

Figure 5A:
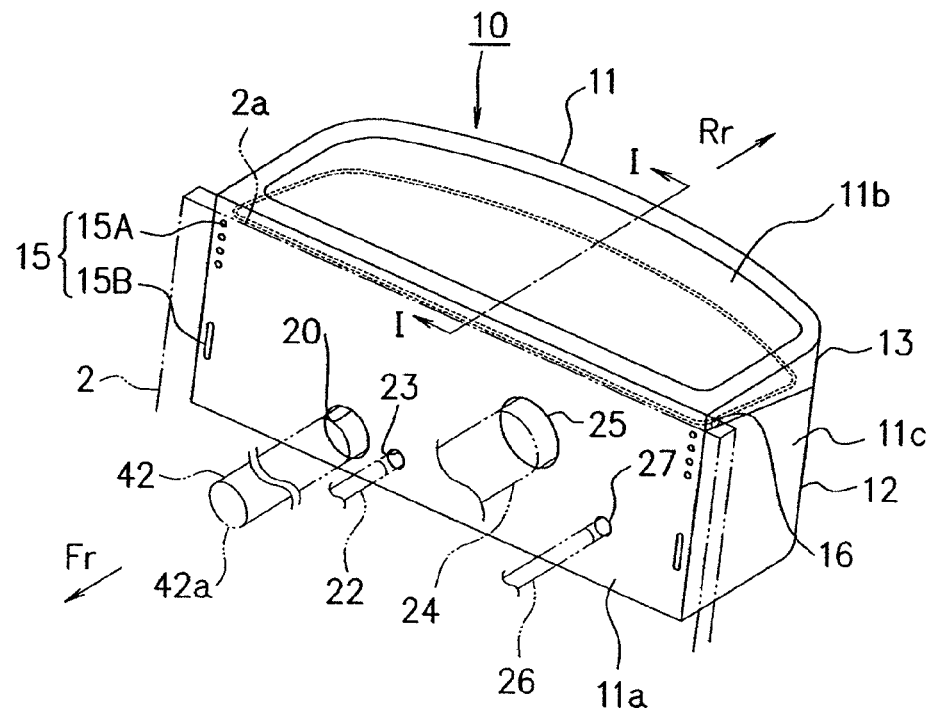
FIGS. 5A and 5B illustrate a structure example of an outboard motor casing according to the present invention, FIG. 5A being a perspective view illustrating a member and so on extending toward a hull side and FIG. 5B being a cross-sectional view taken along a line I-I in FIG. 5A and illustrating an internal structure.
Figure 5B:
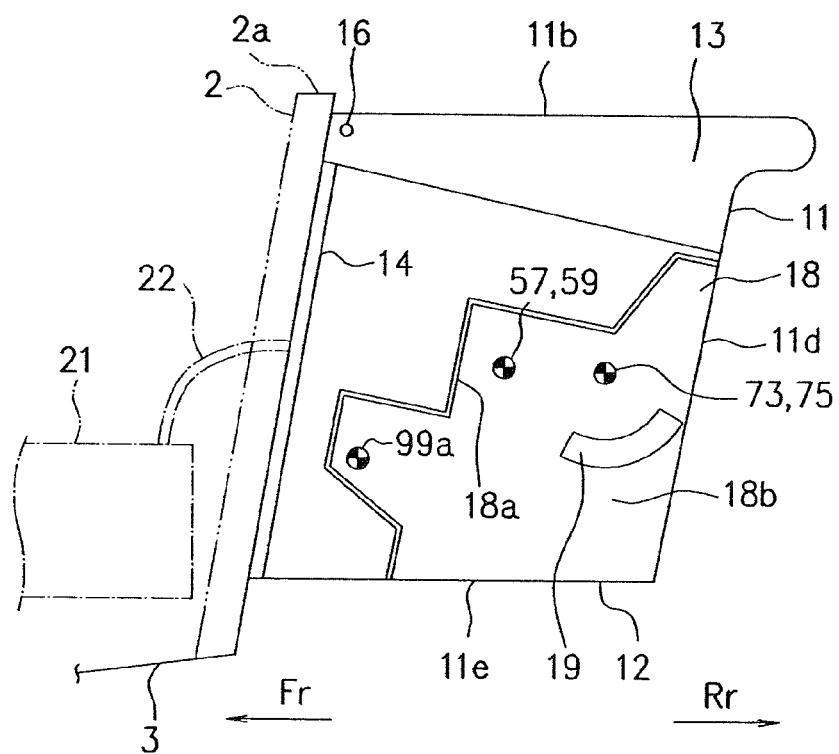

With reference also to FIGS. 5A and 5B, the casing 11 is formed as a case having substantially the same width as the stern (typically the transom board 2) of the hull 1. The basic form of the casing in this example is a substantially rectangular parallelepiped shape with a left-right width direction being a longitudinal direction, and a longitudinal direction of the rectangular parallelepiped is the hull width direction (hereinafter abbreviated as a beam direction). A case of the casing 11 has at least a front face portion 11a coupled to the transom board 2, and a substantially flat upper face portion 11b at a height substantially the same as or reasonably lower than a top portion 2a of the transom board 2. The casing 11 further has a side face portion 11c on both ends in the beam direction, a rear face portion 11d on which the screw is disposed as will be described later, and a bottom face portion 11e disposed reasonably higher than the boat bottom 3 of the stern portion, and faces of them constitute the basic form.

The casing 11 also includes a casing body 12 and a cover 13 attached in an openable/closable manner on an upper part of the casing body. On an inner side of the front face portion 11a of the casing body 12, a base plate 14 which is a body separated from the front face portion 11a is coupled integrally (see FIG. 5B). The base plate 14 is formed of an aluminum alloy or the like, supports components of the outboard motor 10 such as the power unit and so on, and supports a force, load or the like generated when the outboard motor operates. Incidentally, the casing 11 itself includes predetermined rigidity, and is appropriately applicable to supporting or attaching outboard motor components housed inside.

Further, the base plate 14 (including the front face portion 11a of the casing 11) is provided with attaching holes 15 leading to the hull 1. In this example, on the both left and right ends of the base plate 14, a plurality of upper attaching holes 15A aligned in an upward and downward direction and a single lower attaching hole 15B are formed, and the base plate 14 and therefore the entire outboard motor 10 can be fixed firmly to the hull 1 by bolts (not illustrated) inserted through the attaching holes 15A and 15B. Incidentally, the lower attaching hole 15B may be a long hole formed along the upward and downward direction.

Figure 6:
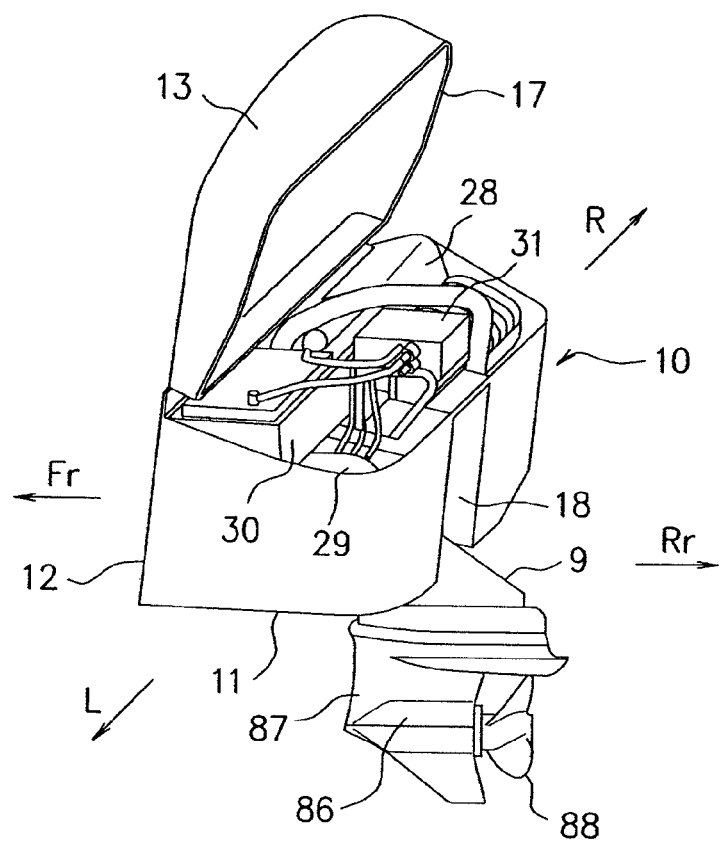
FIG. 6 is a perspective view illustrating a state that a cover is opened from a casing body in the outboard motor casing according to the present invention.

The cover 13 constitutes the upper face portion 11b but is coupled pivotably via a hinge 16 in the vicinity of a front portion upper end of the casing body 12. By pivoting the cover 13 about the hinge 16 to open as illustrated in FIG. 6, the inside of the casing 11 is released, and this allows freely accessing the power unit or the like thus exposed in the casing 11. The cover 13 can be opened to perform an inspection or the like of the inside easily, and convenience for such kind of operation can be improved. A seal 17 (see FIG. 6) is provided on closed portions or abutting faces of the casing body 12 and the cover 13, where high water tightness of the casing 11 is ensured and maintained by closing the cover 13.

Figure 7:
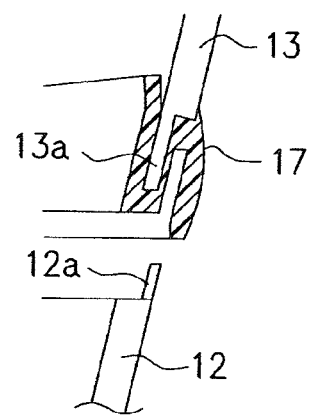
FIG. 7 is a perspective view illustrating an example of a seal structure between the casing body and the cover in the outboard motor casing according to the present invention.

Here, the seal 17 is provided across the entire circumferences along the abutting faces of the casing body 12 and the cover 13, as illustrated in FIG. 6. As illustrated in FIG. 7, a side seal as the seal 17 is attached along an opening edge portion, namely a closing portion 13a of the cover 13. When the cover is closed, the side seal is tightly sandwiched between the closing portion 13a and the closing portion 12a of the casing body 12, and thus high water tightness against the casing 11 can be obtained.

Further, by the upper face portion 11b of the casing 11, namely, the upper surface of the cover 13 being made flat, the outboard motor 10 is integrated smoothly and continuously from the hull 1 as an extension of the deck of a craft or boat in terms of function and design. Incidentally, on the upper surface of the cover 13, appropriately sized concaves and convexes may be formed to provide an anti-slip effect. Besides that, a separate anti-slip rubber or the like may be attached. Accordingly, not only taking in a net, taking in a caught fish, and pulling in of a target person during rescue become possible, which have been impossible with a conventional outboard motor, but also bringing the stern close to a pier is possible for allowing boarding or getting off the boat via the stern.

Furthermore, on the rear face side of the casing 11, a recessed portion 18 is provided in a middle portion in the beam direction lower than the upper face portion 11b in a region from the rear face portion 11d to the bottom face portion 11e. In this recessed portion 18, there are disposed a propulsion unit for the craft and a tilt/steering mechanism and so on thereof, which will be described later. The recessed portion 18 is formed forward from the rear face portion 11d, but as illustrated in FIG. 5B, it does not reach the front face portion 11a, that is, a front wall 18a is formed before the front face portion 11a. This front wall 18a is bent stepwise or in a projecting and recessed form, so as to ensure an arrangement and operation space or the like for the tilt mechanism or peripheral devices, members and the like thereof.

Further, the side walls 18b are provided with a guide portion or guide 19 for supporting a lateral direction thrust of a swivel bracket, which will be described later. This guide 19 is formed of a resin plate with high slidability in an arc shape with the tilt shaft 73, namely, a tilt axis being the center and is attached fixedly in the recessed portion 18 (to the side walls 18b thereof). By thus providing the guide 19, it is possible to prevent the swivel bracket and the side walls 18b of the recessed portion 18 from contacting directly (in a sliding manner) when the propulsion unit is trimmed/tilted while a force in a lateral direction (beam direction) is occurring, such as when the outboard motor 10 is pivoted for example. Incidentally, the bottom face portion 11e of the casing 11 is set appropriately higher than at least the boat bottom 3.

Further, as illustrated in FIG. 5A, a plurality of through holes are formed through the front face portion 11a of the casing 11 as well as the base plate 14 and the transom board 2 by boring them together. Specifically, there are formed a through hole 20 for inserting an intake pipe 42 for supplying combustion air to the engine, a through hole 23 for inserting a fuel pipe 22 for supplying fuel to the engine from a fuel tank 21, and a through hole 25 for passing a ventilation air pipe 24 for venting the inside of the casing 11, as will be described later. Furthermore, there is formed a through hole 27 for inserting cords or cables 26 connecting devices or instruments or members in the casing 11 and a steering device on the hull 1 side electrically (including a control signal and the like) or mechanically. Incidentally, a watertight retaining member (seal or the like) is provided on each of these through holes during installation.

Overall Structure of the Power Unit

Figure 8:
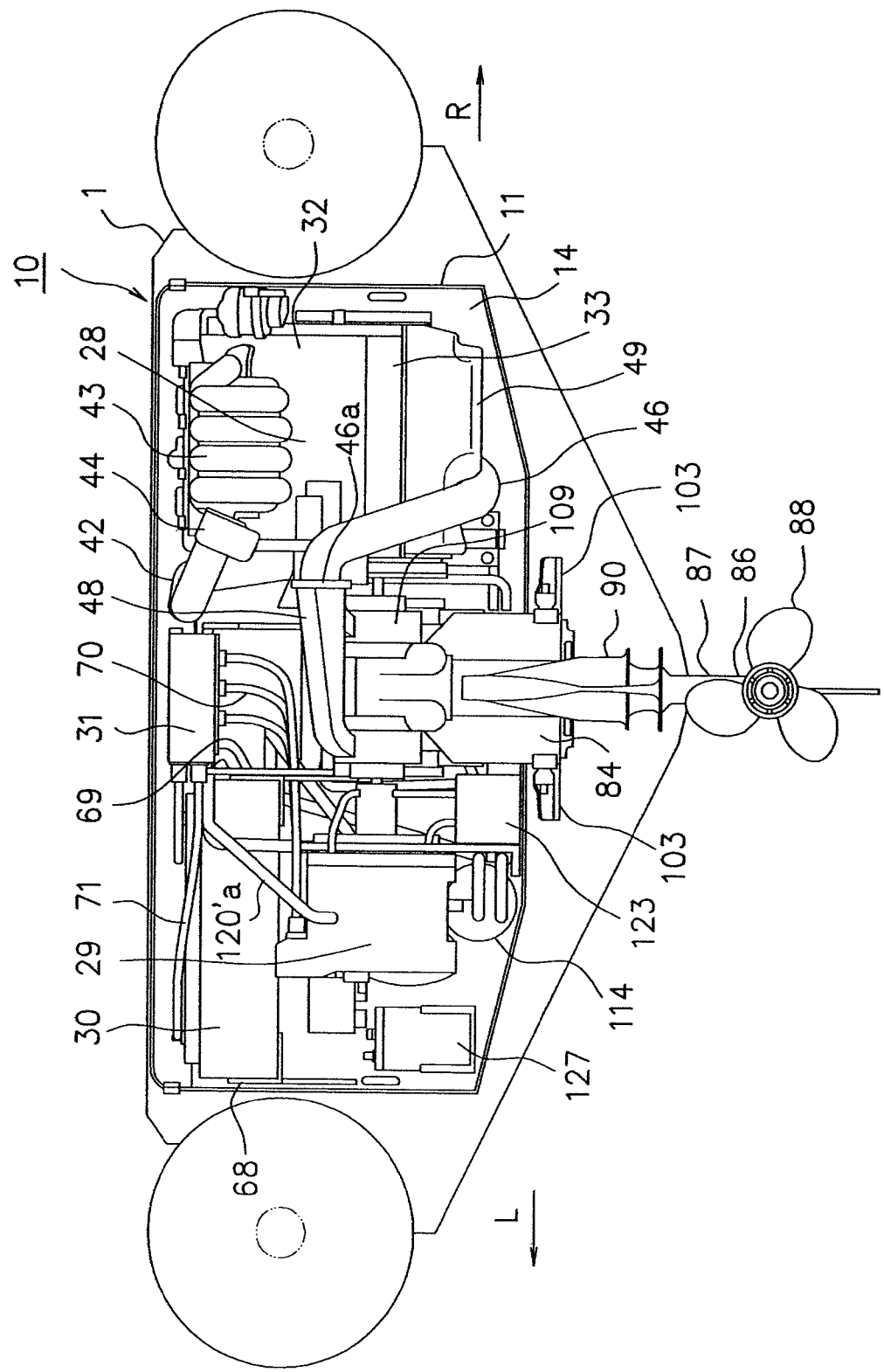
FIG. 8 is a rear view of the power unit housed in the outboard motor casing in the embodiment of the present invention.
Figure 9:
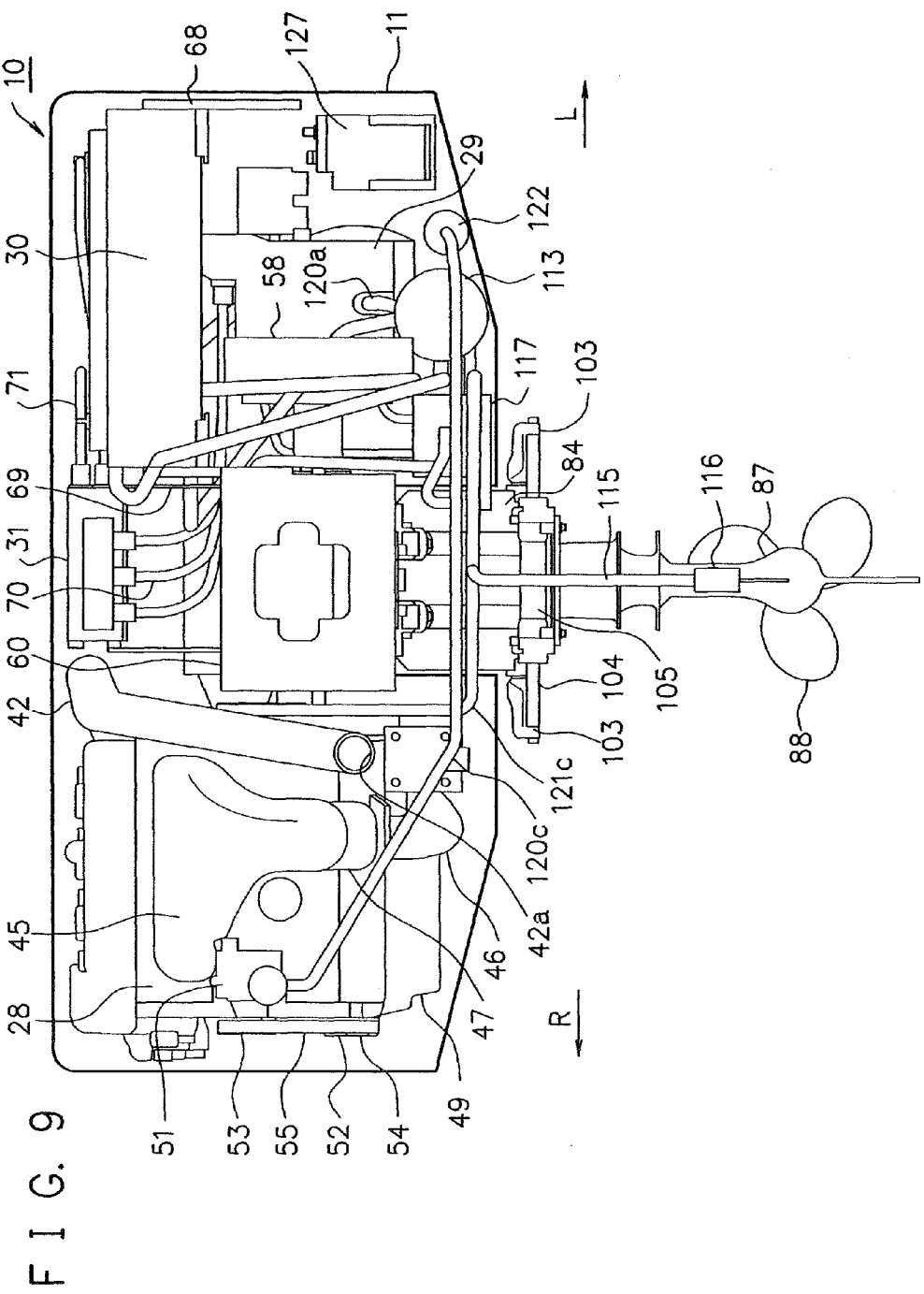
FIG. 9 is a front view of the power unit housed in the outboard motor casing in the embodiment of the present invention.
Figure 11:
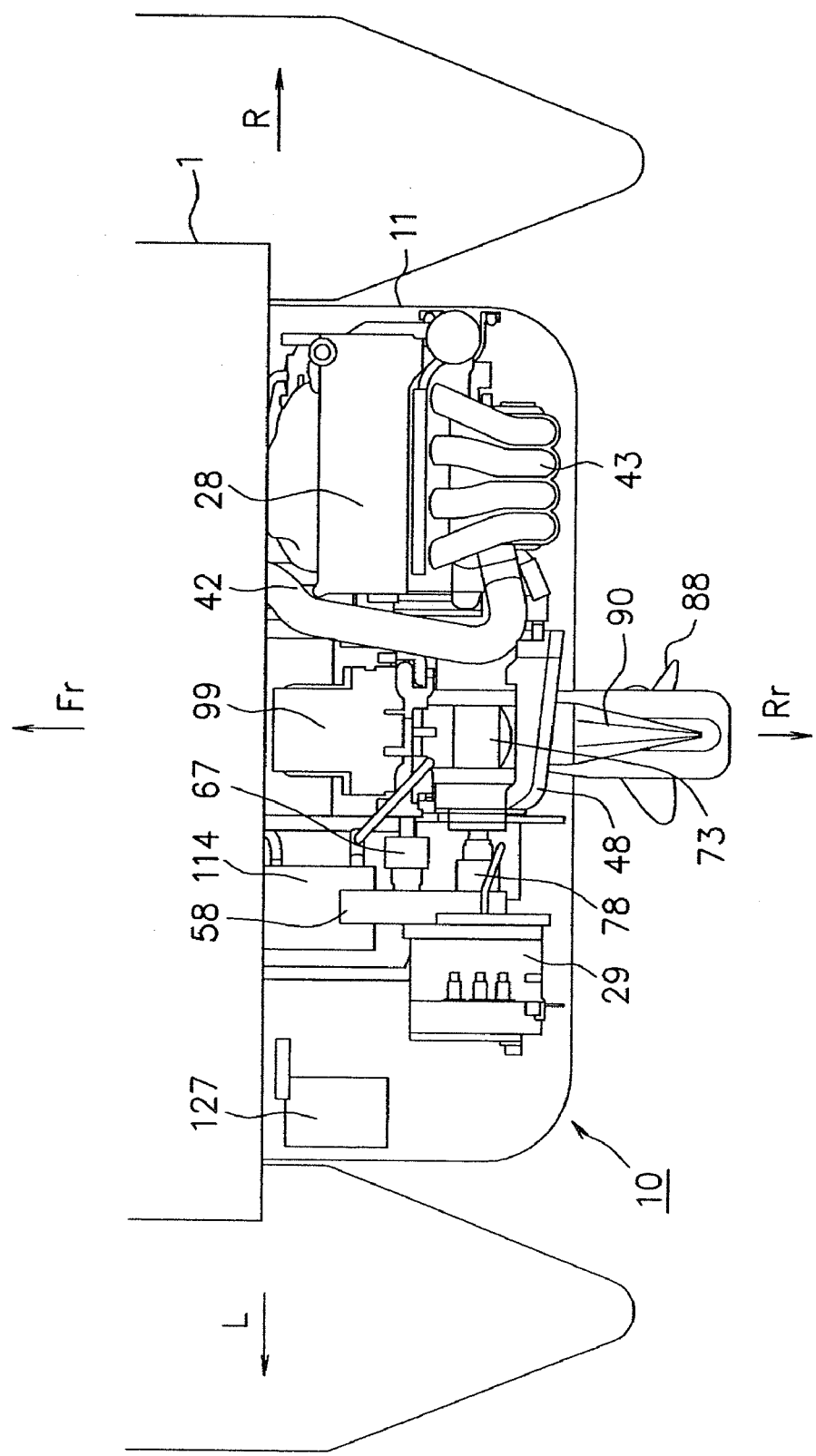
FIG. 11 is a top view of the power unit housed in the outboard motor casing in the embodiment of the present invention.
Figure 12:
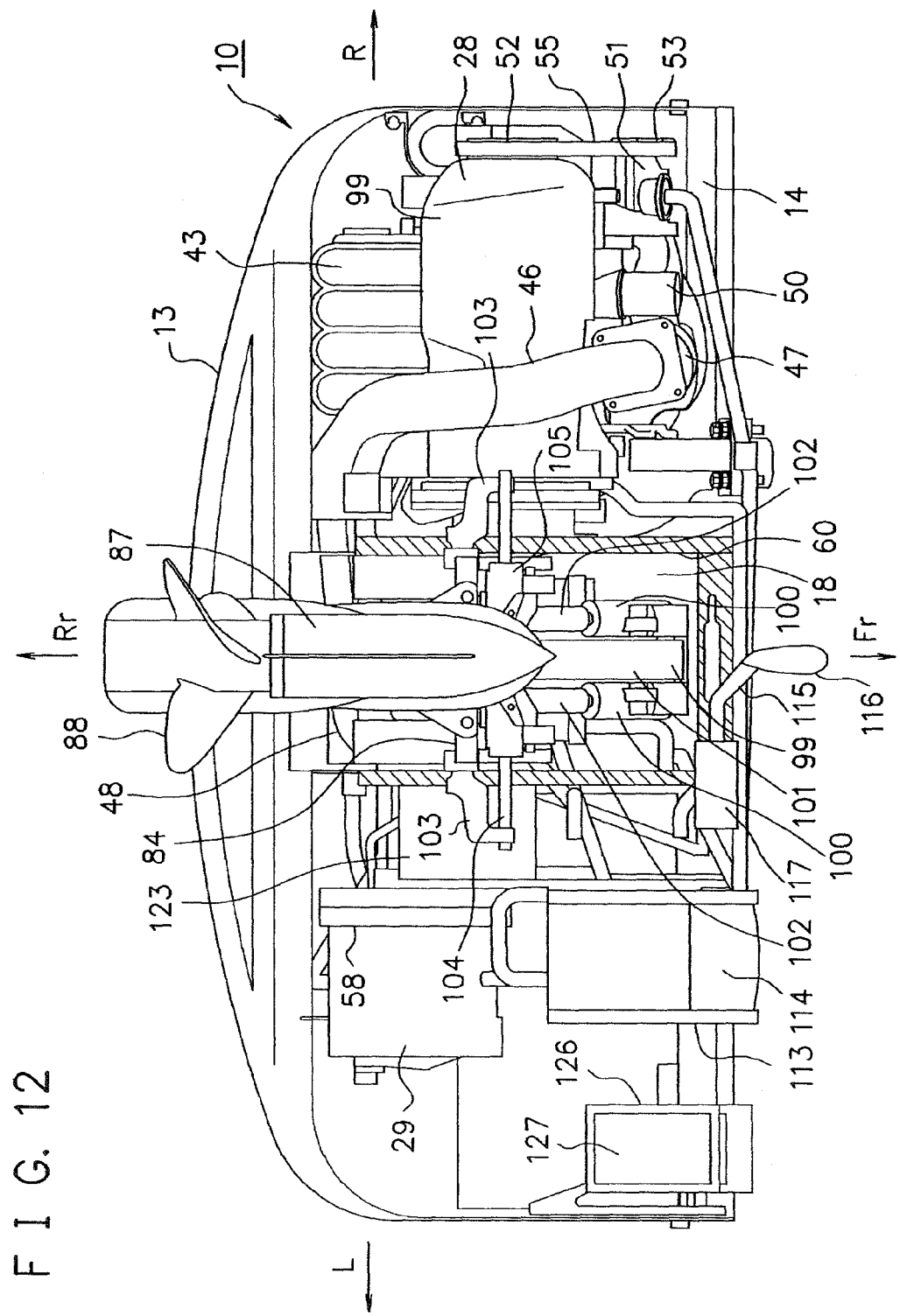
FIG. 12 is a bottom view of the power unit housed in the outboard motor casing in the embodiment of the present invention.
Figure 13:
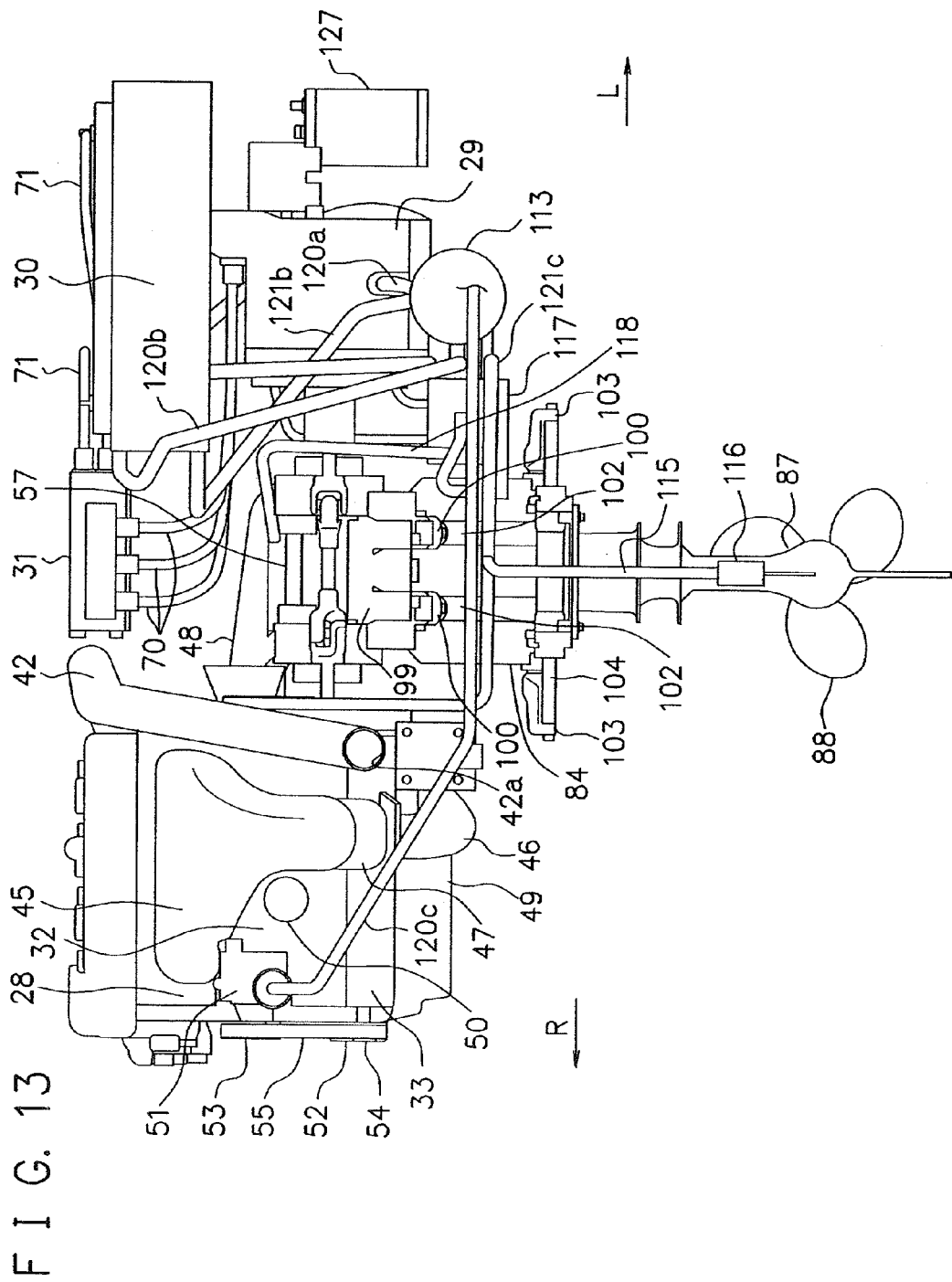
FIG. 13 is a front view of the power unit housed in the outboard motor casing in the embodiment of the present invention.
Figure 14:
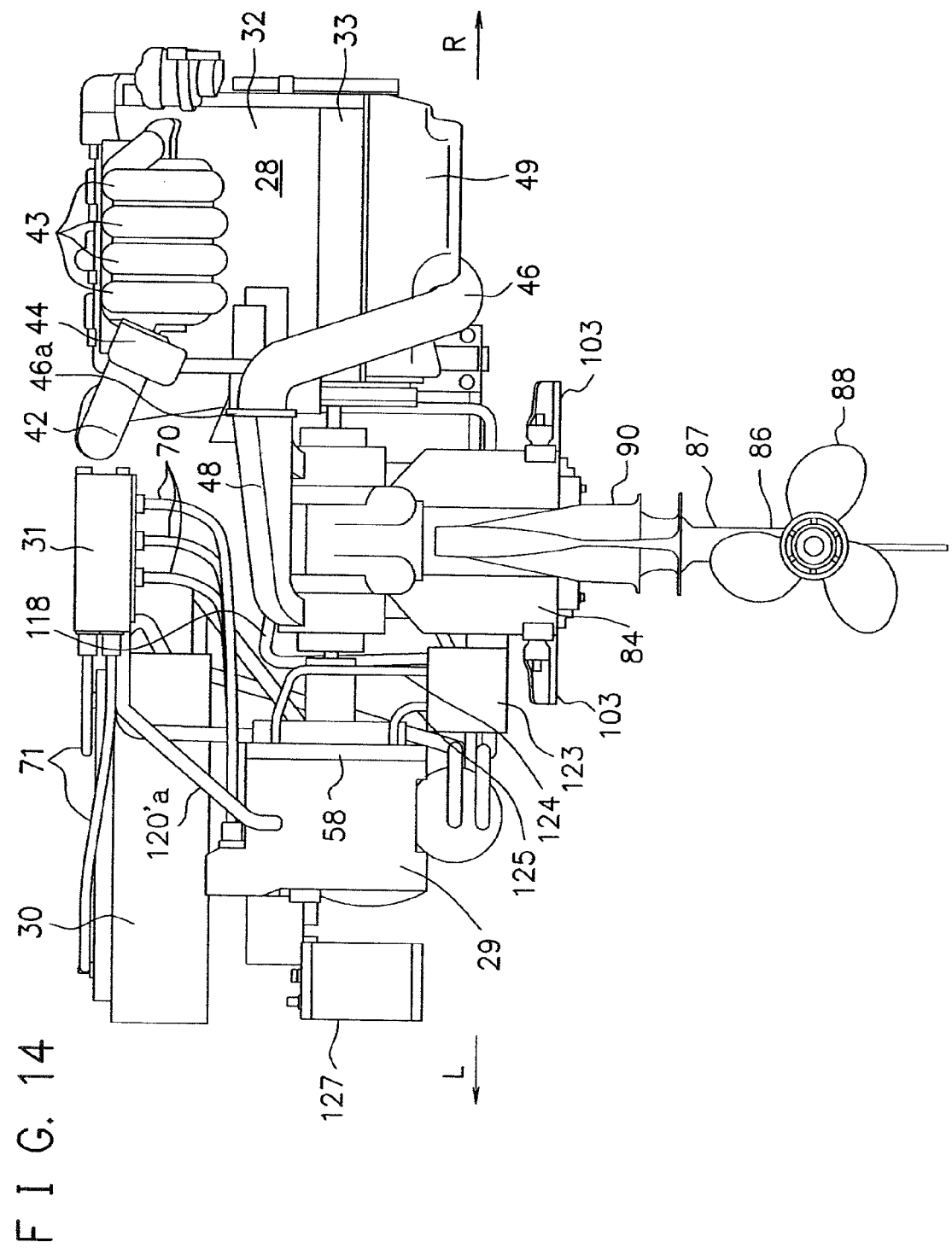
FIG. 14 is a rear view of the power unit housed in the outboard motor casing in the embodiment of the present invention.
Figure 15:
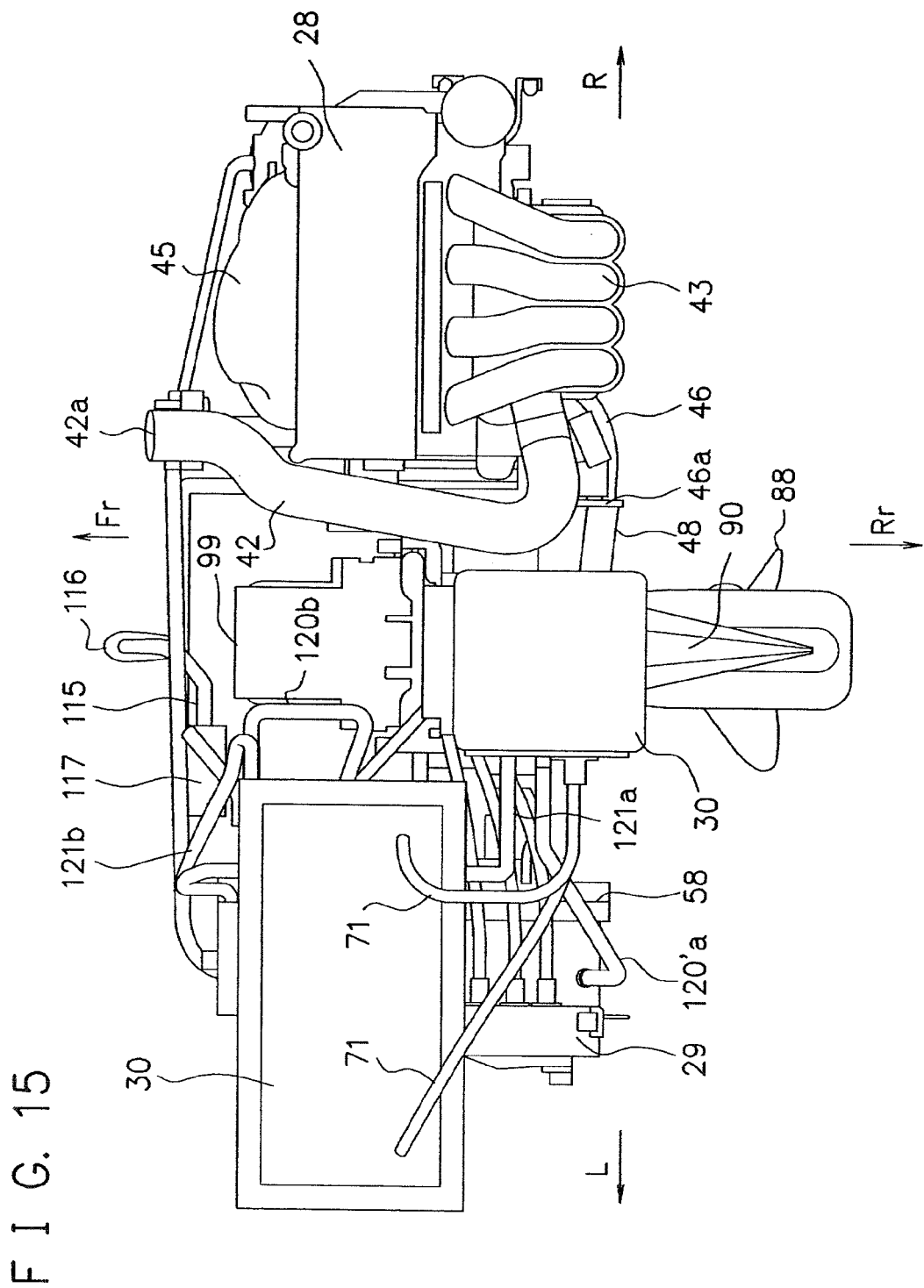
FIG. 15 is a top view of the power unit housed in the outboard motor casing in the embodiment of the present invention.
Figure 16:
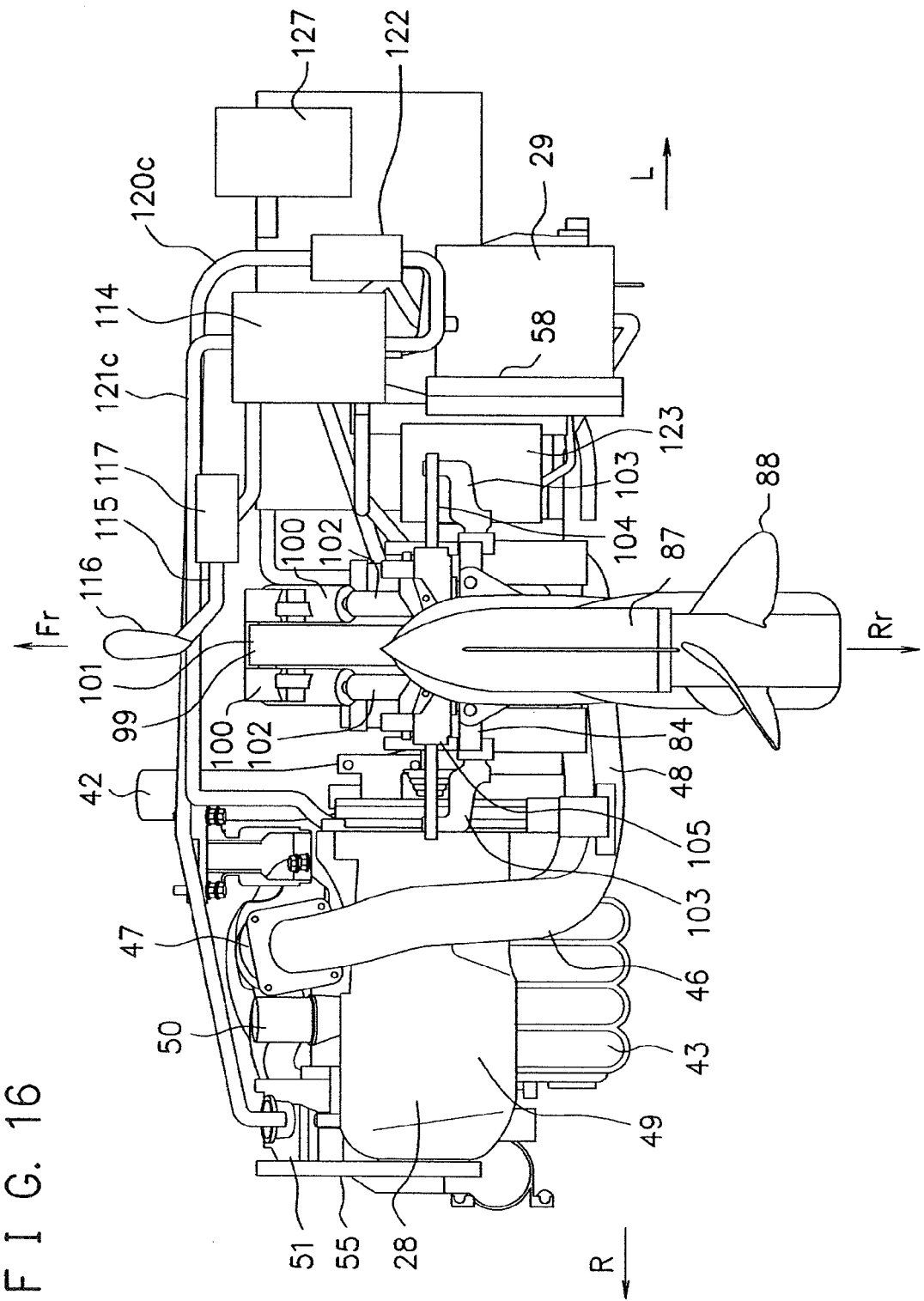
FIG. 16 is a bottom view of the power unit housed in the outboard motor casing in the embodiment of the present invention.

Next, the power unit housed in the casing 11 will be described. Here, FIG. 8 is a rear view of the power unit, FIG. 9 is a front view, FIG. 10 is a left side view, FIG. 11 is a top view, FIG. 12 is a bottom view, FIG. 13 is a front view, FIG. 14 is a rear view, FIG. 15 is a top view, and FIG. 16 is a bottom view. Components of the respective parts will be described in further detail with reference also to these drawings.

The hybrid outboard motor 10 of the present invention has, as its power unit, an internal combustion engine and an electric motor as main motive power, which are operated independently or simultaneously to drive the propulsion unit. In this embodiment, the electric motor combines a generator function, that is, it generates motive power as an electric motor and also functions as a generator to supply generated electric power to a battery (hereinafter referred to as a motor generator). This motor generator is permanent magnet AC synchronous motor type. When used as an electric motor, it uses three-phase AC supplied from a battery via an inverter to rotate a rotor to which permanent magnets are attached in synchronization with the three-phase AC, thereby generating large torque despite its small size. On the other hand, when used as a generator, the rotor is rotated by motive power of the internal combustion engine to generate three-phase AC, and the battery is charged based on this three-phase AC via an inverter. An electric energy storage device for driving the motor generator is typically a battery (or cells), but capacitors or the like may be used.

Heavy objects of the main members constituting the power unit, namely, the internal combustion engine, the motor generator, the inverter, the battery, and so on are housed in the casing 11 compactly in a well-balanced manner. First, as illustrated in FIG. 6, FIG. 8, and the like, the internal combustion engine, namely an engine 28 is disposed on one of the left and right sides, the right side in this example, of the casing 11, with the longitudinal direction of its case being the beam direction. Further, a motor generator 29 and a battery 30 (for high voltage) located forward and obliquely upward therefrom are disposed on the left side as the other side of the left and right sides of the casing 11. That is, the engine 28 as a main component member of the power unit, the motor generator 29 and the battery 30 are arranged in parallel from left to right in the casing 11. The inverter 31 is disposed at a substantially middle in the beam direction in this example, but it may be disposed on the opposite side of the engine 28, that is, near the left side. In either case, they are arranged with a well-balanced weight distribution between the left and right sides of the casing 11.

More specifically, a crank shaft of the engine 28 and an input shaft of the motor generator 29, which are coupled to each other, are arranged horizontally along the beam direction. Further, a tilt axis which will be described later is provided on an extended line of the output shaft of the motor generator 29, and the propulsion unit is suspended from this tilt axis at a center in the beam direction. Note that details of them will be described later.

Among components of the power unit, the engine 28, the motor generator 29, and the battery 30, which account for a large portion of its weight, are horizontally arranged substantially symmetrically about the center in the casing 11 as described above. Such an arrangement structure causes the barycenter of the entire power unit system to be close to the side of the hull 1 (transom board 2), thereby inhibiting extension in a forward and backward direction. At the same time, the horizontal arrangement, that is, the crank shaft being not arranged along the vertical direction inhibits extension in the upward and downward direction, particularly in the upward direction. These components are housed compactly in the casing 11. In this manner, a power transmission path between the engine 28 and the motor generator 29 is set horizontally, and can be arranged close to the transom board 2. Thus, the barycenter position of this entire system is close to the transom board 2. Therefore, on the water, the posture of the hull 1 in which the outboard motor 10 is mounted is suppressed from declining toward the stern as much as possible, thereby allowing quite smooth, easy and appropriate transition to planing.

Engine

Figure 17:
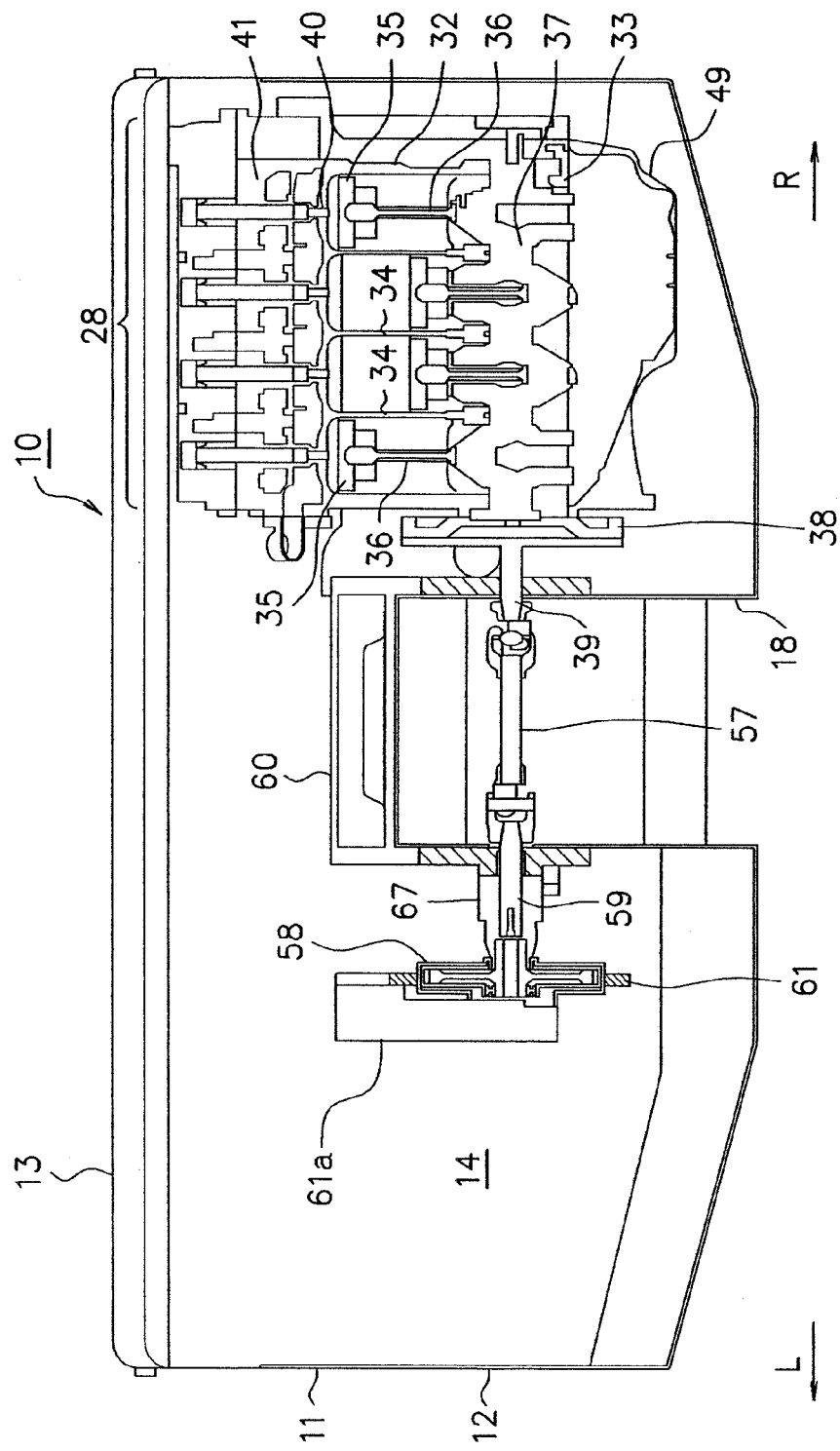
FIG. 17 is a cross-sectional view illustrating a coupling structure of an engine and a speed reducer in the power unit housed in the outboard motor casing according to the present invention.
Figure 18A:
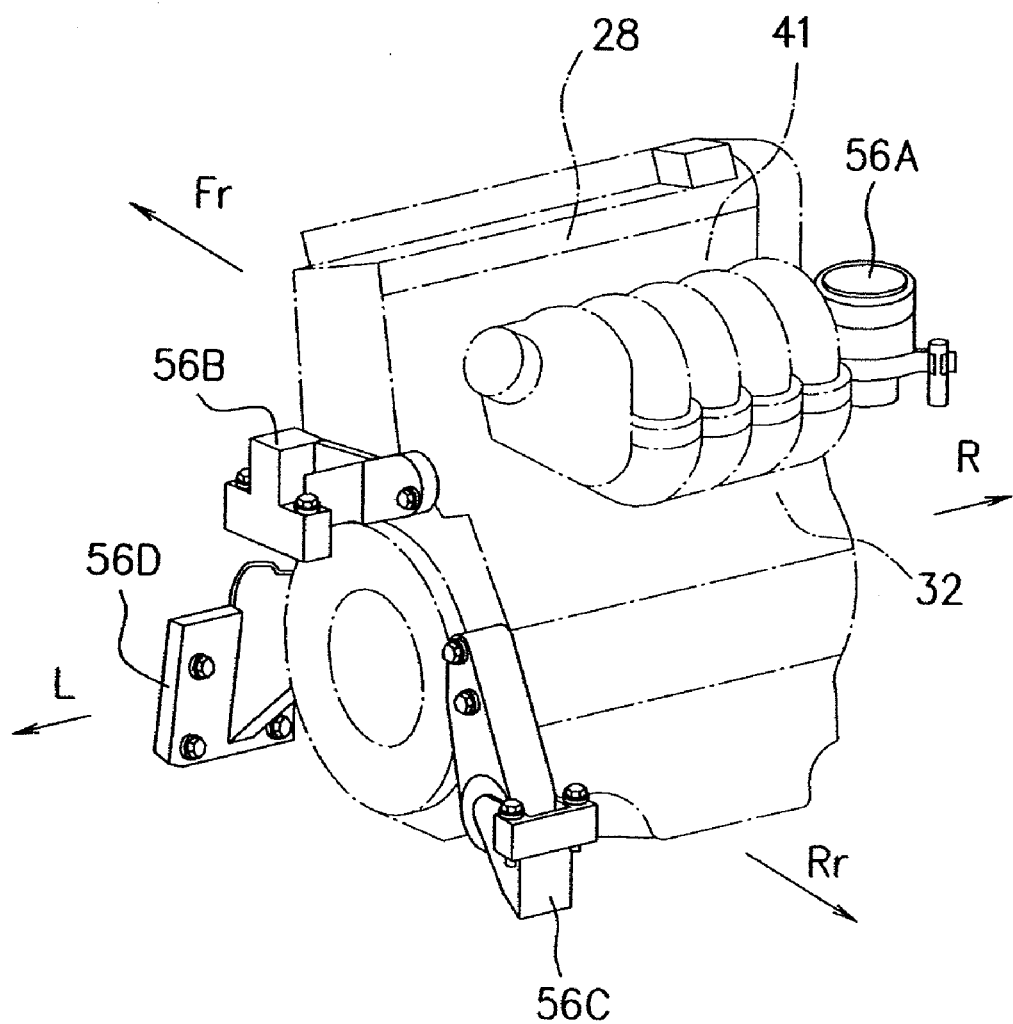
FIG. 18A is a view illustrating a structure example of engine mounts in the power unit housed in the outboard motor casing according to the present invention.

As the internal combustion engine, a water cooled, multi-cylinder (four-cylinder in this example), in-line, four-stroke gasoline engine is used. Note that the displacement, the number of cylinders, the type, or the like of the engine can be changed appropriately as necessary, and are not limited to this example. Further, it is not limited to a gasoline engine and may be a diesel engine. With reference to FIG. 17, in a cylinder block 32 and a crank case 33 of the engine integrally coupled together, a piston 35 is housed reciprocally in a cylinder bore 34 of each cylinder, and each piston 35 is coupled to a crank shaft 37 via a connecting rod 36. The crank shaft 37 is disposed along the beam direction (left and right direction), and to a fly wheel 38 attached to an end of the shaft, an engine output shaft 39 extending leftward is attached concentrically with the crank shaft 37.

In an upper portion of the piston 35 which reciprocates in each cylinder bore 34 of the engine 28, a spark plug 40 is fitted, and a valve driving device driving an intake valve and an exhaust valve (both not illustrated) to open and close is housed in a cylinder head 41. In this embodiment, the intake valve is disposed on a rear side in the cylinder head 41, and the exhaust valve is disposed in a front side.

On an intake side, as illustrated in FIG. 9 and the like, an intake pipe 42 extends to the hull 1 side in a front portion of the casing 11 (see also FIG. 5A), and air is taken from an air intake port 42a on a tip thereof. The air intake port 42a is placed in a chamber or a space in the hull 1 that will not be exposed to waves, splashes, rain, and the like. As illustrated in FIG. 8 and FIG. 14, the single intake pipe 42 branches in an intake manifold 43 into the respective cylinders, and a throttle body is disposed at this branch point. An air-fuel mixture formed in the throttle body 44 with an appropriate mixing ratio is supplied to the intake manifold 43.

Further, on an exhaust side, as illustrated in FIG. 9, FIG. 13, and the like, an exhaust manifold (and its cover) 45 from the respective cylinders extends downward and converges to be connected thereafter to a single exhaust pipe 46. A catalyst unit 47 is provided at this convergence point, and an exhaust purified by the catalyst unit 47 is discharged into the exhaust pipe 46. With reference to FIG. 8, FIG. 14, and the like, the exhaust pipe 46 goes under an oil pan 49 which will be described later and extends to the rear side of the engine 28, and is drawn upward again and thereafter connected to an exhaust guide pipe 48. Incidentally, when drawing the exhaust pipe 46 thus, for example, appropriate positions on the casing 11 and the cylinder block 32 are used to attach support brackets and the like, and the exhaust pipe 46 can be supported via these support brackets. Further, a muffler (silencer) may be provided at an appropriate position in the middle of the exhaust pipe 46. From the exhaust pipe 46, the exhaust further passes through the exhaust guide pipe 48, an exhaust passage, and so on which will be described later, to be discharged to the outside of the outboard motor 10.

On a lower portion of the engine 28 the oil pan for lubricating oil is disposed, and lubricating oil which lubricated respective parts of the engine 28 is collected in the oil pan 49. The oil collected in the oil pan 49 is supplied again to the respective parts of the engine 28 via an oil filter 50 (see FIG. 12, FIG. 13 and FIG. 16) attached on a front side of the cylinder block 32. Further, an oil pump for circulating the lubricating oil is included.

The main parts (the cylinder block 32, the cylinder head 41, and so on) of the engine 28 are provided with a water jacket through which coolant is distributed and circulated. In this example, it is disposed on a front side appropriate position of the cylinder block 32 as illustrated in FIG. 13 and the like, and has a coolant pump 51 operating by rotation of the crank shaft 37 as a motive power source. A drive pulley 52 is attached to the shaft end of the crank shaft 37 opposite to the fly wheel 38, and on the other hand, a driven pulley 53 is attached to a rotation shaft of the coolant pump 51. A timing belt 55 for example is wound via a guide pulley 54 between both the pulleys 52, 53, and with this belt the coolant pump 51 is driven by rotation of the crank shaft 37 to circulate the coolant along predetermined channels.

In the above-described case, cooled coolant is supplied to the coolant pump 51 from a heat exchanger which will be described later. The coolant used for cooling the engine 28 returns to the heat exchanger, and is supplied again to the coolant pump 51 after being cooled.

The engine 28 is supported on predetermined positions in the casing 11 by support brackets or mounts. As illustrated in FIG. 18A to FIG. 18D, and the like, predetermined portions or the like of the cylinder block 32 or the cylinder head 41 are supported by a plurality of mounts 56A to 56D. Each of the mounts 56A, 56B, 56C, 56D can be attached directly or indirectly to an appropriate position of the casing 11. Alternatively, they can be attached using the base plate 14, or can be attached to a frame structure member (not illustrated) supported on the base plate 14. Further, the set positions, the quantity, and so on of the mounts 56A to 56D can be selected appropriately in relation to the space in the casing 11 or support strength and so on with respect to the engine 28. However, in any case, high support rigidity for the engine 28 is ensured and the engine 28 is fixed and supported in a well-balanced manner.

Motor Generator

The side of the engine 28 and the side of the motor generator 29 which are arranged in parallel on the left and right sides in the casing 11 are coupled to each other via a universal joint 57, as illustrated in FIG. 13, FIG. 17, or the like. In this case, a speed reducer 58 (first stage) is coupled integrally to the motor generator 29, and the both of them are integrated as a unit. Specifically, the universal joint 57 and the motor generator 29 are coupled via the speed reducer 58. One end side (right side) of the universal joint 57 is coupled to the engine output shaft 39 as illustrated in FIG. 17, and the other end side (left side) is coupled to an input shaft 59 of the speed reducer 58. Basically, the crank shaft 37, the engine output shaft 39, the universal joint 57, and the input shaft 59 of the speed reducer 58 are arranged substantially along the same axis, namely, the beam direction.

Here, corresponding to the recessed portion 18 in the middle portion in the beam direction of the casing 11, a main bracket 60 having a U shape in bottom view (in top view) is disposed as illustrated in FIG. 12, and the like (note that it is indicated by hatching in FIG. 12). The main bracket 60 is supported fixedly to the base plate 14 by bolts or the like via a center side portion of the U shape on the base plate 14, and both side portions of this center side portions are arranged extending rearward from the base plate 14 to sandwich (the side walls 18b of) the recessed portion 18 from both left and right sides. Further, as illustrated in FIG. 17, near the left side of the main bracket 60, a motor bracket 61 having an "L" shape or a hook shape is disposed. As an attaching method of this motor bracket 61, for example, it can be fixed to the base plate 14 via a bottom side portion 61a of this L shape, for example. The motor bracket 61 supported thus extends rearward from the base plate 14 (see FIG. 17 and the like), and supports the speed reducer 58 integrally coupled to the motor generator 29. Note that the universal joint 57 is disposed in the inside area of the recessed portion 18 of the casing 11, that is, disposed outside the casing 11.

Figure 19:
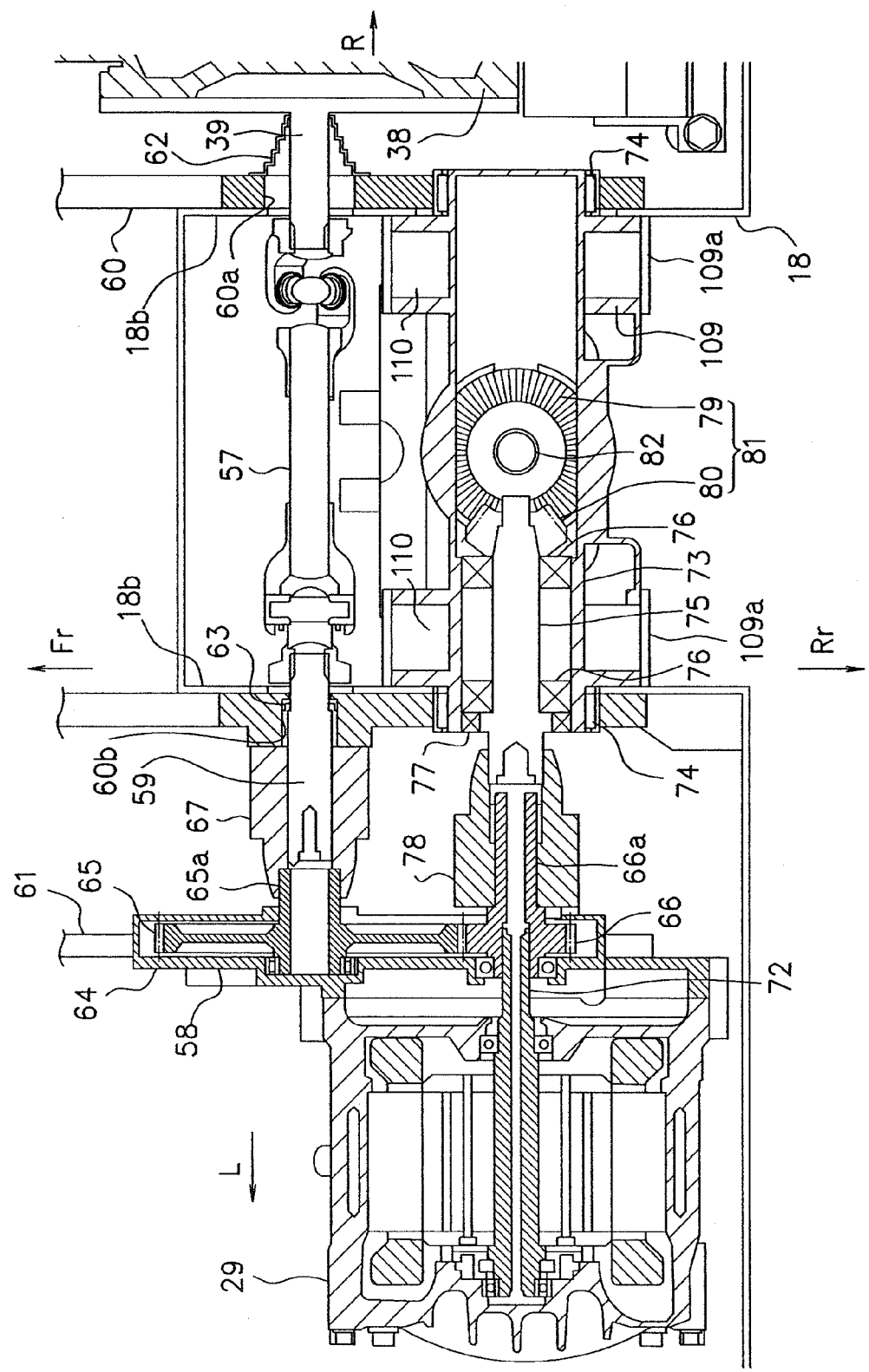
FIG. 19 is a cross-sectional view illustrating a coupling structure of the engine and a motor generator in the power unit housed in the outboard motor casing according to the present invention.

As illustrated in FIG. 19, in the main bracket 60 (and the side walls 18b of the recessed portion 18), a hole 60a for inserting the engine output shaft 39 and a hole 60b for inserting the input shaft 59 of the speed reducer 58 are bored. Among them, one hole 60a is formed larger in diameter than the engine output shaft 39, and a boot 62 is fitted to the gap formed between them to keep it watertight. Further, to the other hole 60b, a seal or gasket 63 is fitted.

As described above, the engine 28 is fixed via the mounts 56A to 56D, and the motor generator 29 is fixed via a mount (the motor bracket 61). While the engine 28 is operating, the crank shaft 37 and therefore the engine output shaft 39 as the axial center may be displaced in position depending on the operation status of the engine 28, due to torque reaction force, imbalance in inertial forces of reciprocating parts and rotating parts, and the like. Also in the motor generator 29, the axial center may be displaced in position depending on the operation status due to torque reaction force, and the like. In such a case, displacement of axial centers that occurs between them can be absorbed and smooth transmission of torque can be ensured by coupling the engine 28 and the motor generator 29 (specifically the input shaft 59 of the speed reducer 58) via the universal joint 57.

Speed Reducer

Next, as illustrated in FIG. 19 and the like, the speed reducer 58 has in its casing 64 a drive gear 65 connectable to the input shaft 59 and a driven gear meshing with this drive gear 65, which are each supported rotatably. These drive gear 65 and driven gear 66 may be a spur gear or the like, and the change gear ratio between them is set to produce both the rotation speed at which the engine 28 exhibits the highest efficiency in operation and the rotation speed at which the motor generator 29 exhibits the highest efficiency in operation.

A first clutch 67 is interposed between a rotation shaft 65a of the drive gear 65 and the input shaft 59. This first clutch 67 is constituted of what is called an electromagnetic clutch or the like, and is controlled by the hybrid control unit to connect/disconnect the power transmission path between the engine 28 side and the motor generator 29 side appropriately at predetermined timings.

Battery/Inverter

The motor generator 29 combines the electric motor function and the power generating function as described above. The battery 30 as a peripheral device of the motor generator 29 is supported horizontally by a support bracket 68 which is fixedly supported by the base plate 14 to extend backward, as illustrated in FIG. 8, FIG. 10, or the like. The battery 30 is supported at a position located forward and obliquely upward from the motor generator 29 via the support bracket 68, and is arranged on the front face portion 11a side in the casing 11. The battery 30 is also a quite heavy object, and such arrangement close to the front face portion 11a can make the barycenter of the outboard motor 10 be close to the hull 1 side.

Further, as illustrated in FIG. 9 and the like, the inverter 31 is supported by the support bracket disposed on an upper portion of the main bracket 60. In this example, it is arranged in a substantially center portion in the beam direction of the casing 11 or close to the left side, and arranged at a position above the motor generator 29 in side view, as illustrated in FIG. 10 and the like. Further, it is arranged at a position moderately higher than the battery 30 and in the vicinity of the cover 13 of the casing 11.

As described above, the motor generator 29 has functions of electric motor and generator, and accordingly the motor generator 29 and the inverter 31 are connected via three-phase AC electric wires 70, and the battery 30 and the inverter 31 are connected via DC electric wires 71 (see FIG. 13, FIG. 14, and the like). When the motor generator 29 is used as an electric motor, power of the battery 30 is supplied as AC to the motor generator 29 via the inverter 31. On the other hand, when used as a generator, generated power of the motor generator 29 is supplied to the battery 30 as DC via the inverter 31. Incidentally, control of switching them is performed by the hybrid control unit.

A rotor shaft 72 of the motor generator 29 is, as illustrated in FIG. 19, coupled concentrically to the driven gear 66, and a rotation shaft 66a integrated with this driven gear 66 extends to the engine 28 side in a rear side of the input shaft 59 and in parallel with this shaft. On an extended line of this rotation shaft 66a, a tilt shaft 73 is provided laterally and supported rotatably by the main bracket 60, via tilt bearings 74 (which may be needle bearings or the like). The tilt shaft 73 has a hollow structure as its basic form and is arranged in the form of being bridged across the inside width of the recessed portion 18 on a rear side of the universal joint 57 in parallel therewith. One end (right side) of the tilt shaft 73 is closed, and a motor generator output shaft 75 is inserted in the other side (left side). The motor generator output shaft 75 is supported rotatably in the tilt shaft 73 via bearings 76. On the other end of the tilt shaft 73, a seal 77 is inserted between the tilt shaft and the motor generator output shaft 75.

A second clutch 78 is interposed, as illustrated in FIG. 19, between the rotation shaft 66a of the driven gear 66 and the motor generator output shaft 75. This second clutch 78 is constituted of an electromagnetic clutch or the like, and is controlled by the hybrid control unit to connect/disconnect the power transmission path between the motor generator side and the motor generator output shaft 75 side and further the propulsion unit side appropriately at predetermined timings. Incidentally, operation control of the second clutch 78 is performed by the hybrid control unit.

The tilt shaft 73 itself is a gear case, in which specifically an intermediate speed reducer 81 constituted of a bevel gear 79 and a pinion 80 are disposed. The pinion 80 is attached to a tip portion of the motor generator output shaft 75. Further, a bevel gear 79 is attached to an upper end portion of a drive shaft 82 extending downward orthogonally to the motor generator output shaft 75, which is arranged horizontally. By thus placing the intermediate speed reducer 81 between the motor generator output shaft 75 and the drive shaft 82, the efficient rotation speed of the motor generator 29 and the efficient rotation speed of the propeller of the propulsion unit are matched.

Figure 20:
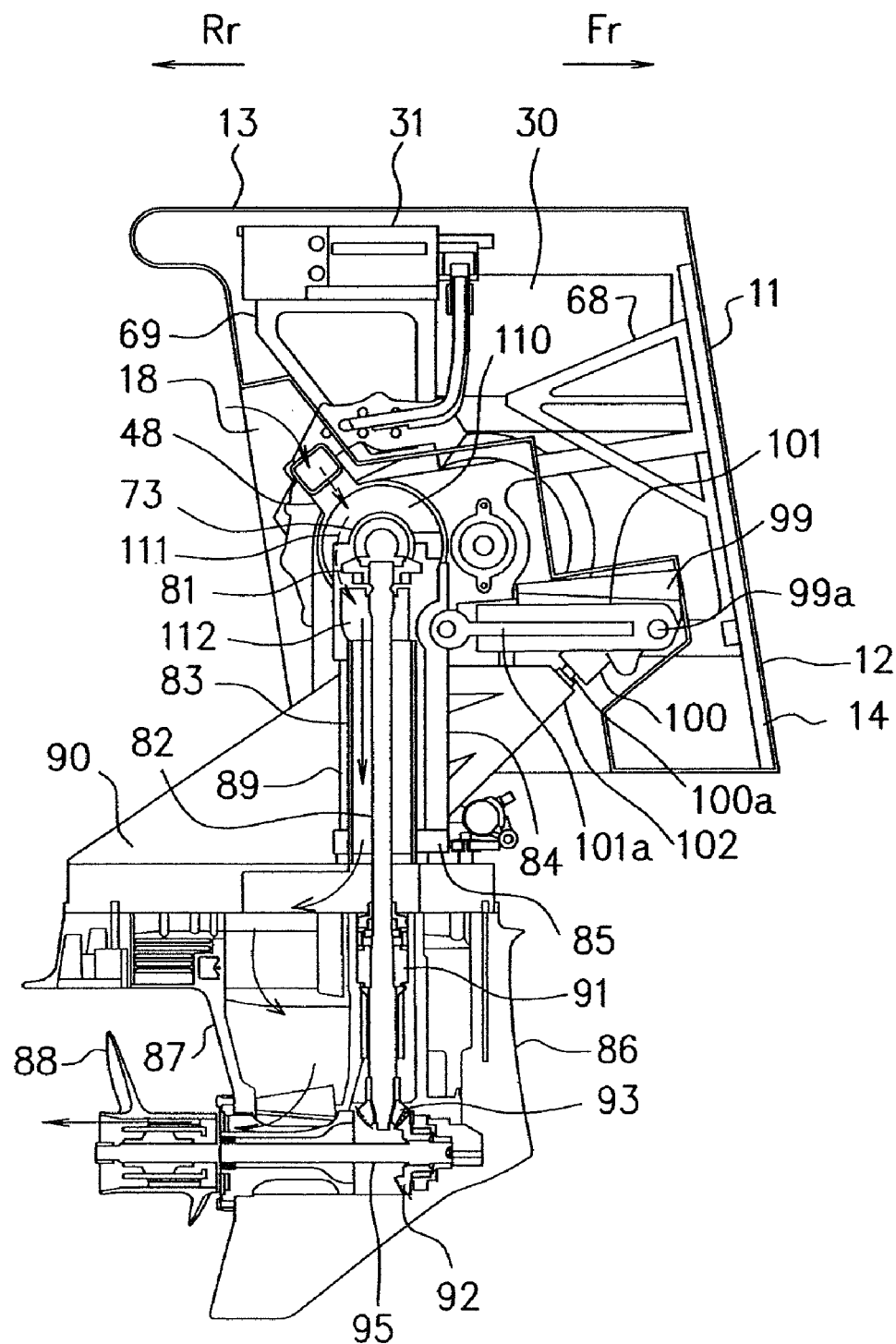
FIG. 20 is a cross-sectional view illustrating a structure example in the vicinity of a tilt axis, a drive shaft, and a propulsion unit in the embodiment of the present invention.
Figure 21:
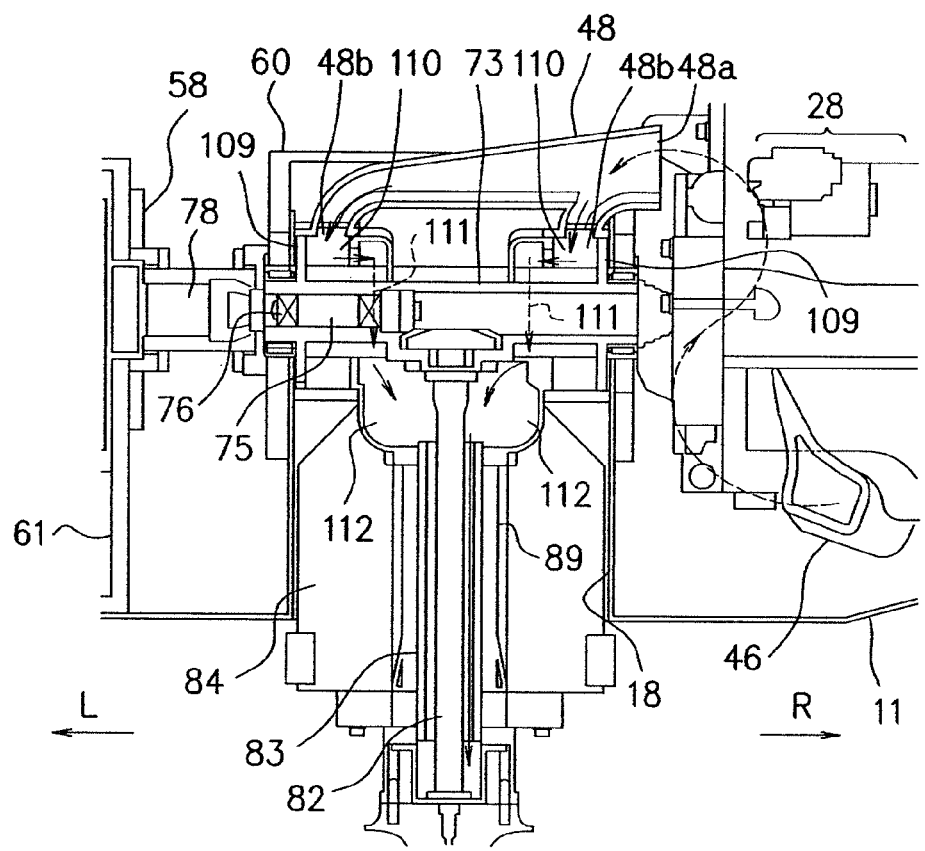
FIG. 21 is a cross-sectional view illustrating a structure example in the vicinity of the tilt axis and the drive shaft according to the present invention.

As illustrated in FIG. 19 to FIG. 21, a drive shaft case 83 is disposed surrounding the drive shaft extending downward from the tilt shaft 73 in the middle portion in the beam direction of the recessed portion 18 of the casing 11. A swivel bracket 84 is disposed on a front side of this drive shaft case 83, and the tilt shaft 73, the drive shaft case 83, and the swivel bracket 84 are coupled integrally to each other. The swivel bracket 84 has, as its basic form, a substantially plate shape that is substantially equal to the inside width of the recessed portion 18 and is wide in the beam direction, and has high rigidity and strength against a load or force such as an external force. A lower steering bracket 85 extending rearward is fixed to a lower end of the swivel bracket 84.

As described above, the motor generator output shaft 75 matches the tilt axis, and the drive shaft suspended downward from the tilt axis and the propulsion unit, which will be described later, are capable of pivoting, that is, tilting in the upward and downward direction about this tilt axis. This allows operation at optimum propelling angles according to the boat speed and propelling force. On the other hand, in a maximum tilt-up posture, the vicinity of the propulsion unit can be separated from the water surface to be in a dry state when moored on the water.

In addition, in (part of) the periphery of the tilt shaft 73, an exhaust passage is formed for exhausting combustion gas produced in the engine 28. This exhaust passage is formed further via an inside of the drive shaft case 83, which will be described later.

Propulsion Unit

As illustrated in FIG. 20 and the like, a propulsion unit 86 having a propeller is disposed under the drive shaft case 83. The propulsion unit includes a gear case 87 having gears therein for driving a propeller, and has a fin shape as the whole. A propeller 88 is attached to a rear end portion of the gear case 87. The drive shaft 82 passes through inside the drive shaft case 83 and further extends downward to reach inside the gear case 87. Here, the gear case 87 is supported pivotably by the lower steering bracket 85 of the swivel bracket 84 via a bearing part 89 disposed surrounding the drive shaft case 83 and a drive shaft housing 90 coupled to the bearing 89.

Figure 22:
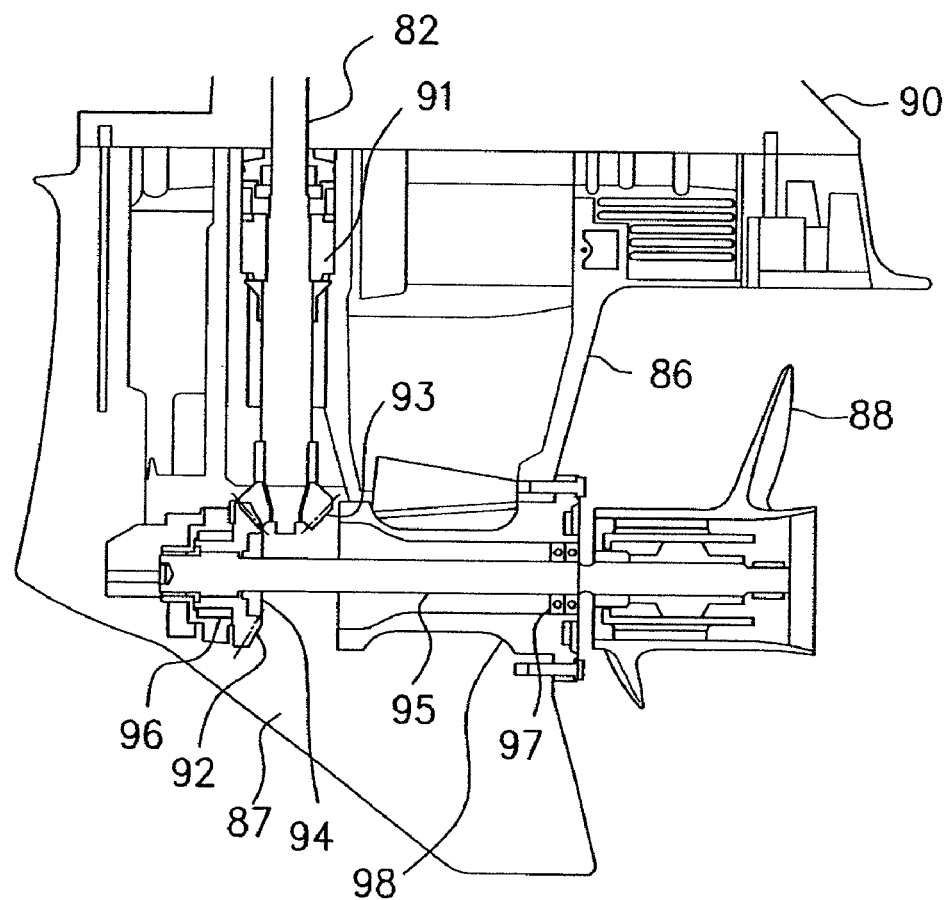
FIG. 22 is a cross-sectional view illustrating a structure example in the vicinity of the propulsion unit in the embodiment of the present invention.

As illustrated in FIG. 22, the drive shaft 82 is supported by a bearing 91 in the gear case 87. A final speed reducer 94 constituted of a bevel gear 92 and a pinion 93 is disposed inside the gear case 87. The pinion 93 is attached to a lower end portion of the drive shaft 82, and the bevel gear 92 is attached to a front end portion of a propeller shaft 95 extending horizontally rearward orthogonally to the drive shaft 82 which is arranged vertically. The propeller shaft 95 is supported rotatably by the bearings 96, 97 in the vicinities of a front end portion and a rear end portion, respectively, and a propeller 88 is attached to the rear end portion. The bearings 96, 97 are disposed inside the bearing housing 98. Accordingly, by rotation of the drive shaft 82, the propeller shaft 95 and therefore the propeller 88 can be rotary driven via the final speed reducer 94.

As described above, the speed reducer 58 is disposed between the engine 28 and the motor generator 29, the intermediate speed reducer 81 is disposed between the motor generator 29 and the drive shaft 82, and further the final speed reducer 94 is disposed between the drive shaft 82 and the propeller shaft 95. The propeller 88 is driven via these first stage, intermediate stage, and final stage speed reducers. Intermediate stage speed reduction ratio×final stage speed reduction ratio is the total speed reduction ratio between the motor generator 29 and the propeller 88, and first stage speed reduction ratio×intermediate stage speed reduction ratio×final stage speed reduction ratio is the total speed reduction ratio between the engine 28 and the propeller 88, and the first stage speed reduction ratio is the speed reduction ratio between the engine 16 and the motor generator 17. By setting the speed reduction ratios in this manner, the engine 28, the motor generator 29, and the propeller 88 are combined so that each of them yields the highest efficiency.

Tilt Mechanism

Next, a tilt mechanism and a steering mechanism for the propulsion unit 86 will be described.

First, the propulsion unit 86 is pivotable in the upward and downward direction via the tilt shaft 73 about a tilt axis of the tilt shaft. The tilt mechanism includes a drive device such as what is called a power trim tilt (PTT). This power trim tilt illustrated schematically in FIG. 23 has, in an integrated form, a pair of hydraulic cylinders 100 on both sides for trimming and a hydraulic cylinder 101 for tilting between them. These hydraulic cylinders 100, 101 are electro hydraulic type and operate with a motor-driven hydraulic pump being a hydraulic source. Trim rods 100a of the hydraulic cylinders 100 and a tilt rod 101a of the hydraulic cylinder 101 are each structured to extend/retract, and an operation stroke of the tilt rod 101a for tilting is set longer than an operation stroke of the trim rod 100a for trimming. The hydraulic cylinders 100 and 101 of the power trim tilt 99 are controlled in operation timing or the like by a control device.

A base end 99a of the power trim tilt 99 is supported swingably (in the upward and downward direction) on the casing 11 side (appropriate portions of the main bracket 60 can be used), as illustrated in FIG. 20 and the like. In this case, a tip portion of the tilt rod 101a for tilting is coupled to the swivel bracket 84. Incidentally, a coupling portion of this tilt rod 101a is lower than the tilt axis. On the other hand, the trim rod 100a of the hydraulic cylinder 100 for trimming is structured to contact the swivel bracket 84 side. In this example, there is provided a contact arm 102 directed to the trim rods 100a and projecting forward and obliquely upward from a front face side of the swivel bracket 84.

Figure 24:
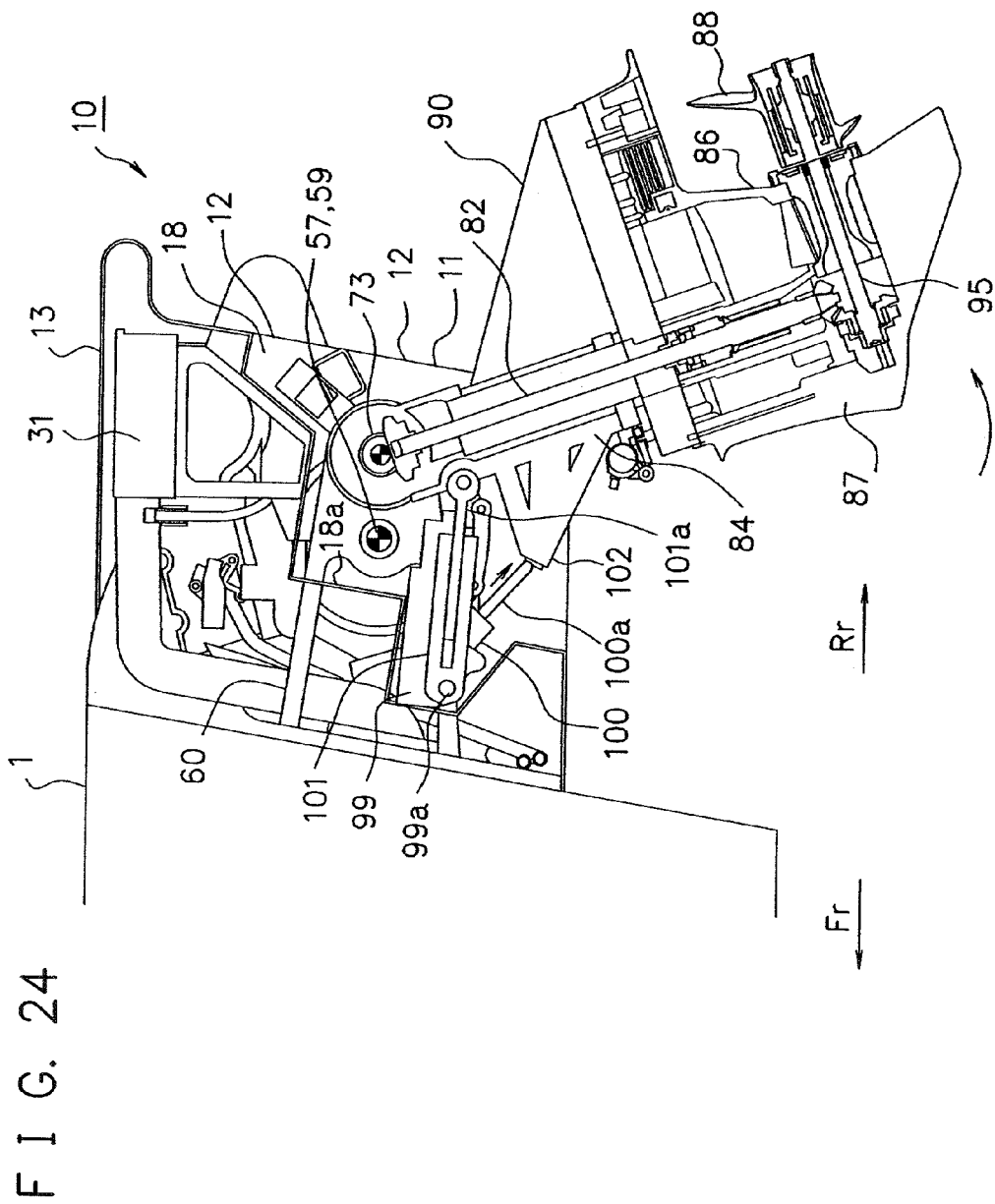
FIG. 24 is a side view illustrating an operation example (propulsion unit trim limit position) of the tilt mechanism according to the embodiment of the present invention.

When trimming is performed by the tilt mechanism, the hydraulic cylinders 100 are actuated to extend their trim rods 100a as indicated by an arrow in FIG. 24 to contact the contact arm 102. This causes the part lower than the tilt shaft 73 to pivot about this tilt shaft 73 as indicated by an arrow, and thereby the entire propulsion unit 86 including the drive shaft 82, the drive shaft housing 90, and so on and the propeller shaft 95 can be tilted. In this case, a trim limit position is at about 20°.

Figure 25:
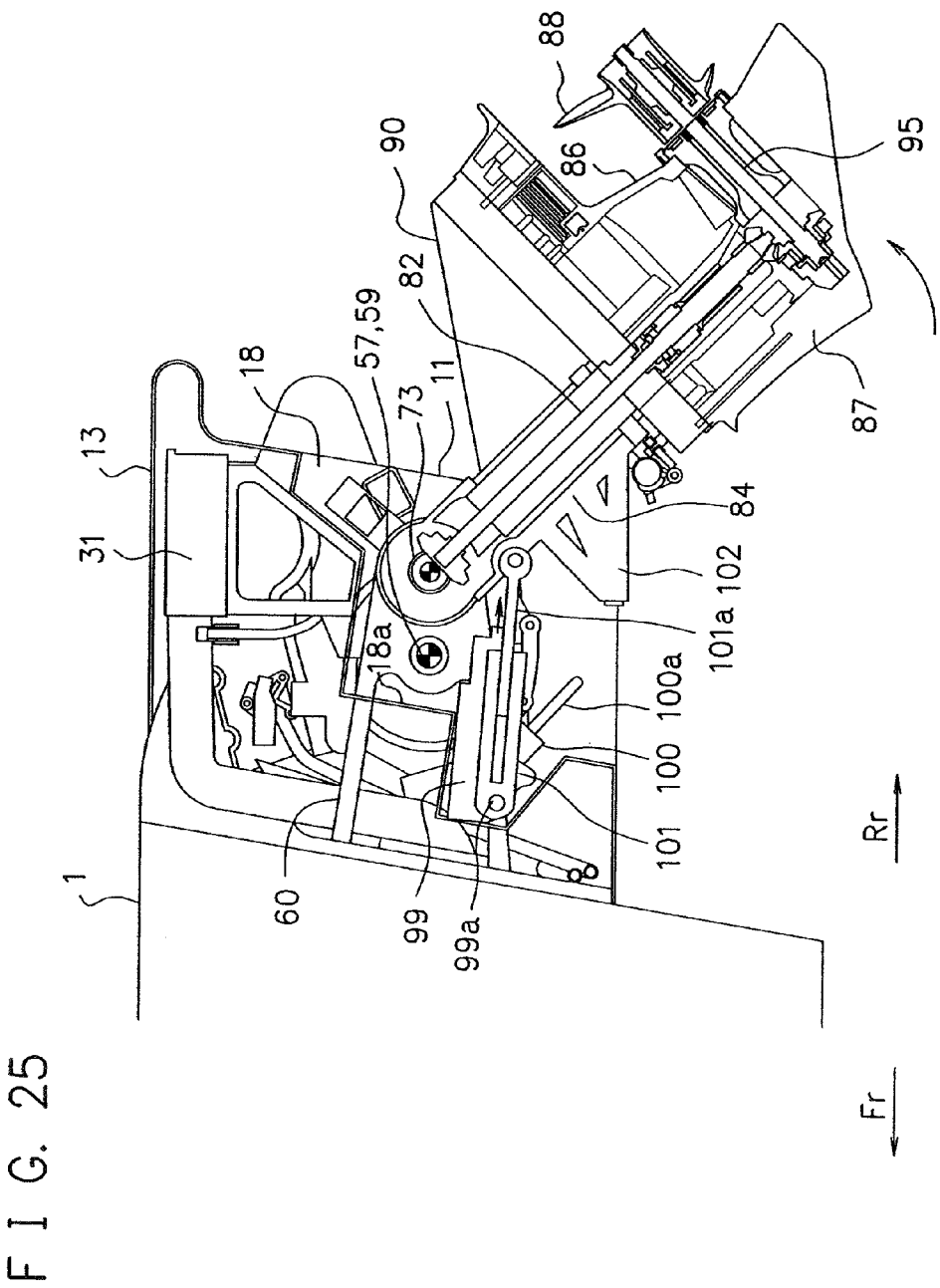
FIG. 25 is a side view illustrating an operation example (propulsion unit shallow position) of the tilt mechanism according to the embodiment of the present invention.

On the other hand, when the hydraulic cylinder 101 is actuated, the tilt rod 101a of the hydraulic cylinder 101 extends as indicated by an arrow in FIG. 25, and the swivel bracket 84 coupled to the tip portion thereof and therefore the part lower than the tilt shaft 73 are caused to further pivot about the tilt shaft 73 as indicated by an arrow. Also in this case, the drive shaft 82, the drive shaft housing 90, and so on and the entire propulsion unit 86 including the propeller shaft 95 can be tilted. In this case, a shallow position of the propulsion unit 86 by tilting is at about 45°.

Figure 26:
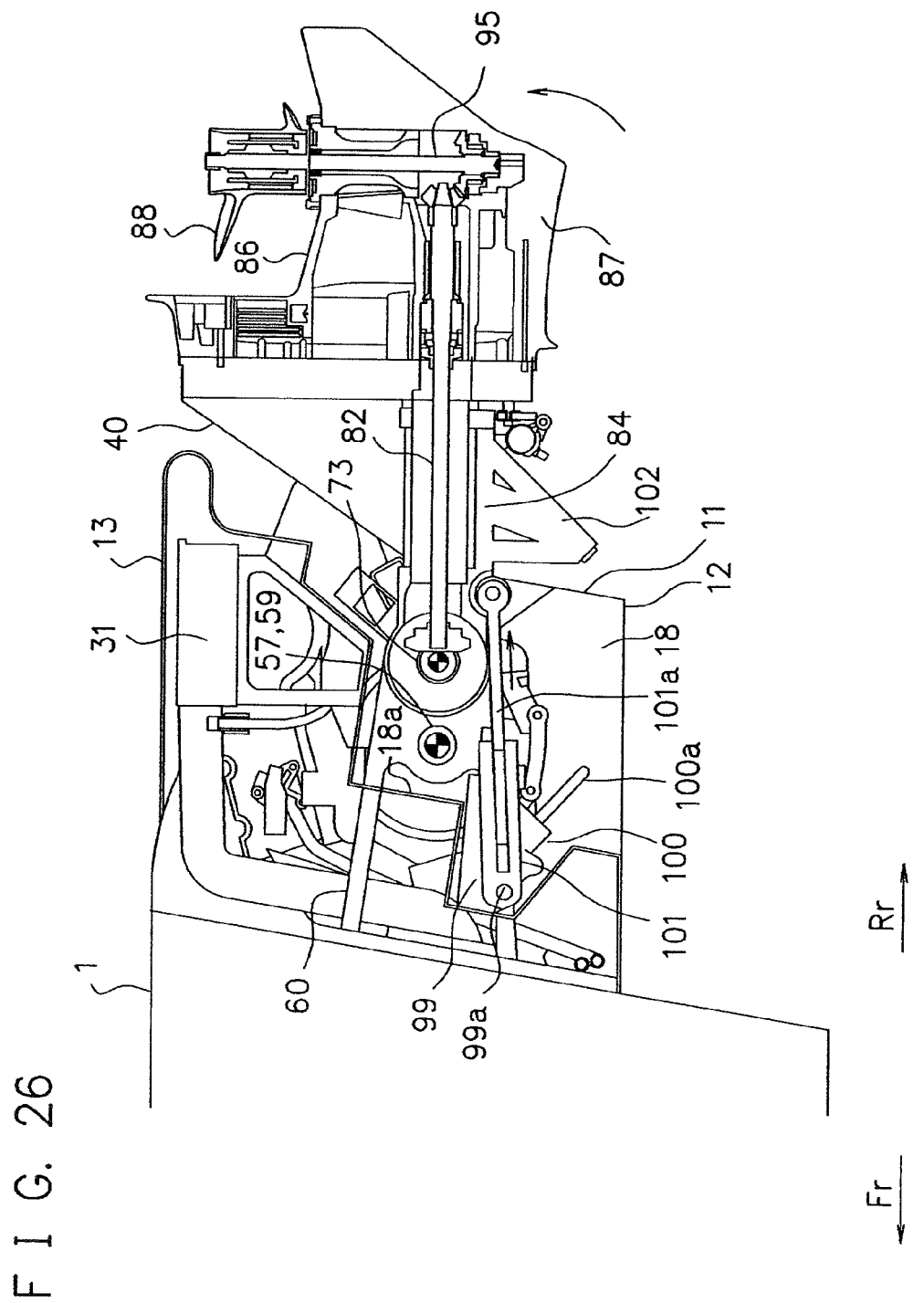
FIG. 26 is a side view illustrating an operation example (propulsion unit storage position) of the tilt mechanism according to the embodiment of the present invention.

This tilt operation can further tilt the propulsion unit 86 to a position at about 90° as a storage position as illustrated in FIG. 26.

Incidentally, an upper limit position when tilted by normal power trim tilt is at about 75° at most.

The hydraulic cylinders 100, 101 have a shock absorbing function. If the propulsion unit 86 collides against an floating object on the water or a sea bottom for example, the propulsion unit may flip up rearward (upward). At this time, shock can be alleviated and absorbed by restricting movement of oil in the hydraulic cylinders with orifices.

Steering Mechanism

Next, the propulsion unit 86 is pivotable in a yaw direction (left and right direction) by a steering mechanism (yawing). This steering mechanism has a pair of steering fixing brackets 103 which project from both the left and right sides of the swivel bracket 84 and extend from a front side of the swivel bracket 84, as illustrated in FIG. 8 and FIG. 13, or FIG. 14 and the like. On the front side of the swivel bracket 84, a steering rod 104 supported at its both ends by these steering fixing brackets 103 is laterally provided. An electrohydraulically driven steering cylinder 105 is fitted with the steering rod 104 to be reciprocated along the steering rod 104, with a motor driven hydraulic pump being a hydraulic source.

Figure 27A:
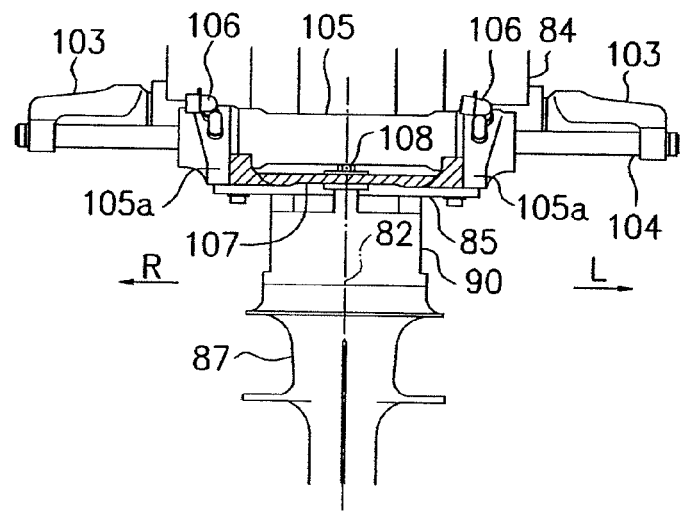
FIGS. 27A and 27B are a front view and a bottom view, respectively, illustrating an operation example (when proceeding straight) of a steering mechanism according to the embodiment of the present invention.
Figure 27B:
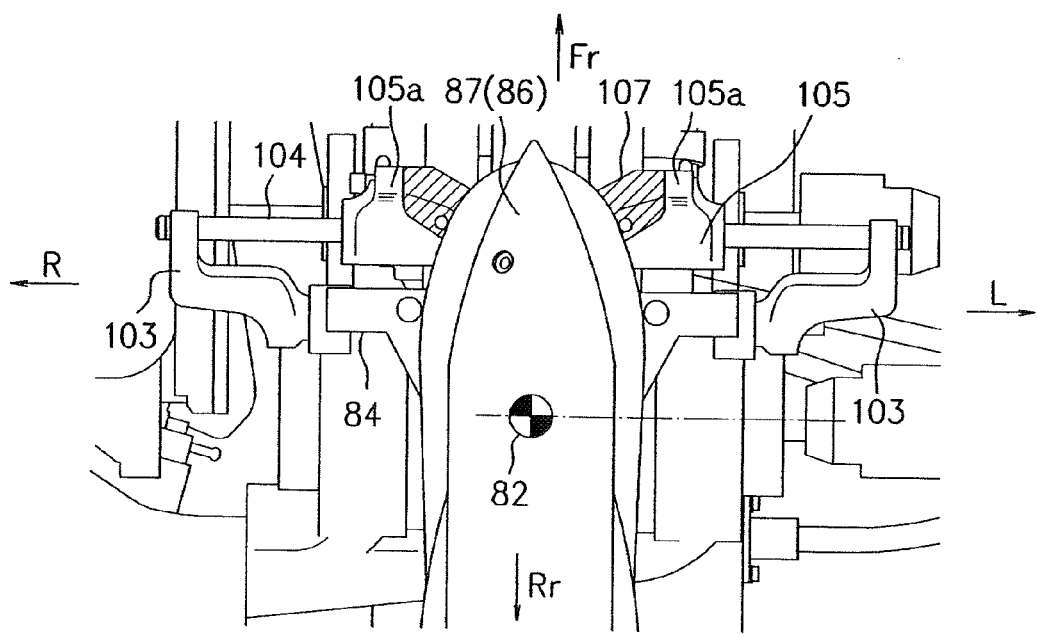

With reference to FIGS. 27A and 27B, hydraulic piping elbows 106 are attached to both ends of the steering cylinders 105, and operating oil is supplied/drained via these hydraulic piping elbows 106. On a lower side of the steering cylinder 105, a steering movable bracket 107 is attached substantially horizontally (indicated by hatching in FIG. 27A) to integrally move with the steering cylinder 105. In addition, on both end portions of the steering cylinder 105, bosses 105a for attaching the steering movable bracket 107 are provided to project. The steering movable bracket 107 is coupled to a coupling pin 108 which is planted in the drive shaft housing 90 side coupled to the gear case 87 side. Accordingly, the gear case 87 and therefore the propulsion unit 86 pivot in the left and right direction via the coupling pin 108 in conjunction with reciprocation of the steering cylinder 105.

Figure 28A:
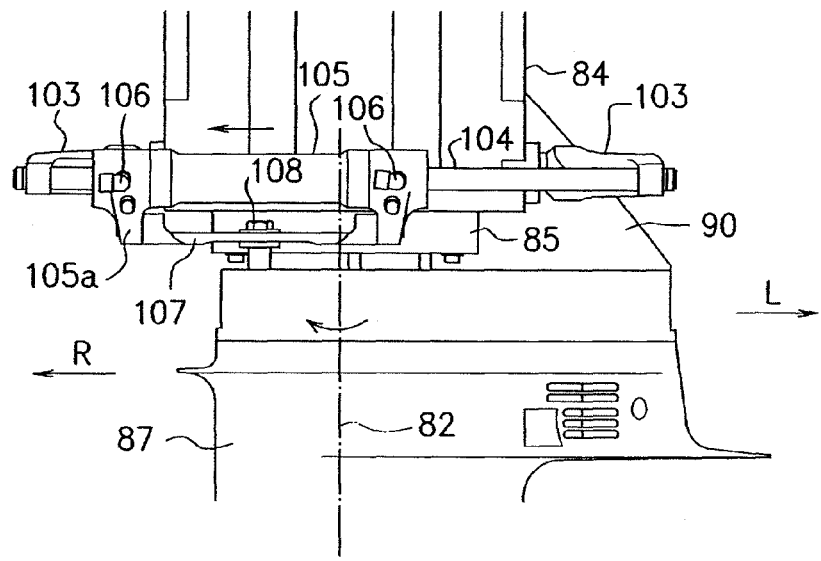
FIGS. 28A and 28B are a front view and a bottom view, respectively, illustrating an operation example (when turning left) of the steering mechanism according to the embodiment of the present invention.
Figure 28B:
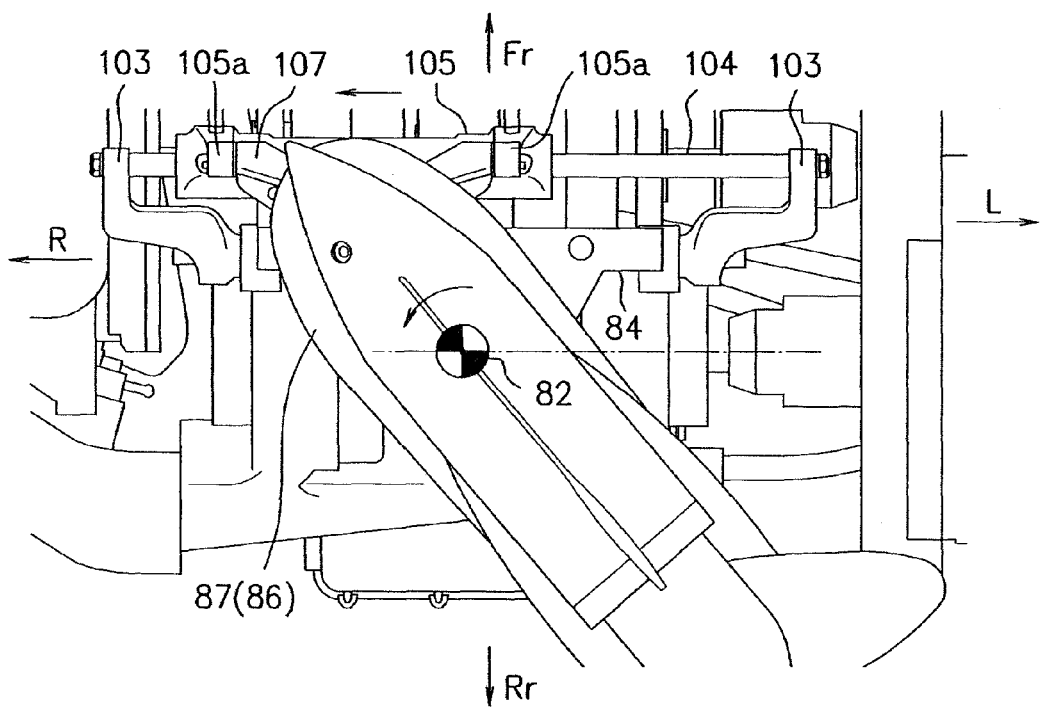

For example, when proceeding straight, as illustrated in FIGS. 27A and 27B, the steering cylinder 105 is positioned in a middle portion in a longitudinal direction of the steering rod 104. At this time, the gear case 87 and therefore the entire propulsion unit 86 are directed in the forward and backward direction, and the boat proceeds straight. Further, when the steering cylinder 105 is moved rightward as indicated by an arrow R in FIG. 28A from this state of proceeding straight, the gear case 87 and therefore the propulsion unit 86 pivot about the steering axis, that is, the drive shaft 82 as the pivot center thereof as indicated by an arrow R in FIG. 28B. Thus, the propulsion unit 86 turns right and the boat turns left.

Figure 29A:
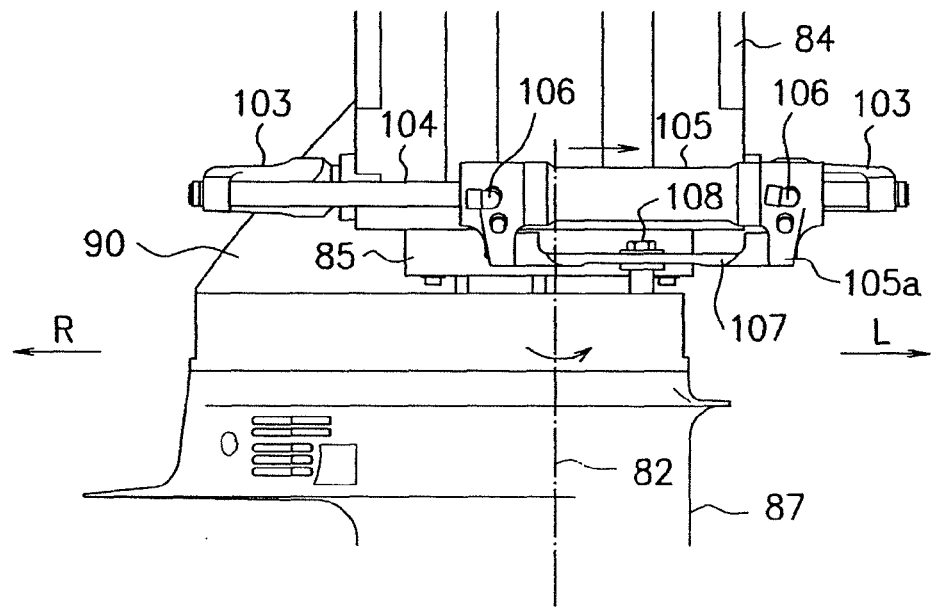
FIGS. 29A and 29B are a front view and a bottom view, respectively, illustrating an operation example (when turning right) of the steering mechanism according to the embodiment of the present invention.
Figure 29B:
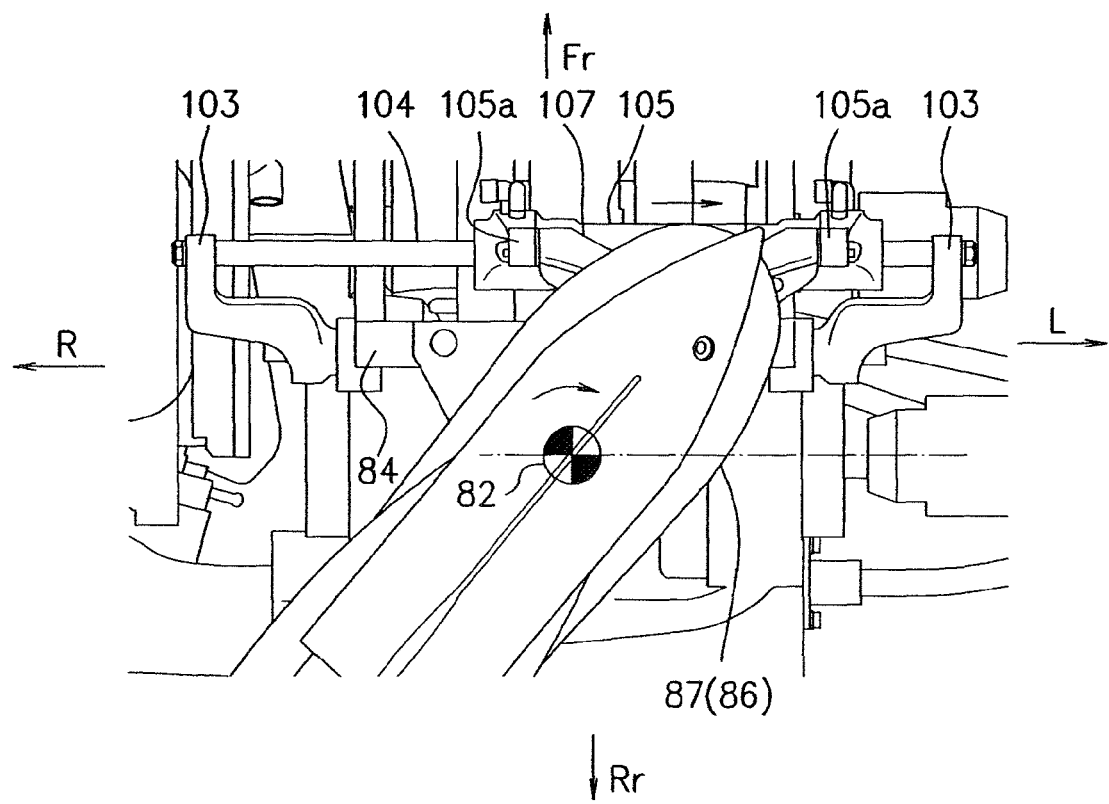

On the other hand, when the steering cylinder 105 is moved leftward as indicated by an arrow L in FIG. 29A from the above-described state of proceeding straight, the gear case 87 and therefore the propulsion unit 86 pivot about the steering axis, that is, the drive shaft 82 as the pivot center thereof as indicated by an arrow L in FIG. 29B. Thus, the propulsion unit 86 turns left and the boat turns right.

Intake/Exhaust System

As described above, on the intake side, air is taken via the air intake port 42a on the tip of the intake pipe 42 extended to the side of the hull 1, and on the exhaust side, an exhaust from the engine is discharged to the exhaust pipe 46. To extend the intake pipe 42 to the hull 1 side, the through hole 20 (see FIGS. 5A and 5B) is formed in the base plate 14 and the transom board 2, and the intake pipe is inserted through this hole. Thus, air can be taken in via the air intake port 42a from a chamber that will not be exposed directly to splashes and rain waters in the boat. Therefore, even when the temperature in the casing 11 increases, low temperature, high density air can be used for combustion, and the engine output will not drop.

On the exhaust side, the exhaust pipe 46 is drawn to pass the lower side (oil pan 49) of the bottom portion of the engine 28 and rise toward the recessed portion 18 on the rear side of the engine 28, as illustrated in FIG. 8 and the like. As described above, the tilt shaft 73 is bridged across the recessed portion 18, and the exhaust guide pipe 48 is arranged substantially in parallel with this tilt shaft 73. As illustrated in FIG. 8 or FIG. 14 and the like, a coupling 46a is attached to an end of the exhaust pipe 46, and the exhaust pipe is connected to the exhaust guide pipe 48 via this coupling 46a. With reference to FIG. 19 to FIG. 21, the exhaust guide pipe 48 has an exhaust introducing port 48a and exhaust discharge ports 48b, and the exhaust introducing port 48a is connected to the exhaust pipe in the casing 11, to which an exhaust is introduced. In addition, a bracket for supporting the exhaust guide pipe 48 can be provided in the recessed portion 18, and the exhaust introducing pipe 48 can be supported via this bracket.

The exhaust guide pipe 48 has the pair of exhaust discharge ports 48b separated from each other in the beam direction, and an exhaust is discharged from each exhaust discharge port 48b to the exhaust passage, which will be described later. In both end portions of the tilt shaft 73, there are provided connecting parts 109 for connecting the respective exhaust discharge ports 48b of the exhaust guide pipe 48 on outer peripheral portions thereof. Inside the connecting portions 109, a pair of annular rooms or spaces 110 in a donut shape having a rectangular cross section is formed. These annular spaces 110 are connected to the exhaust discharge ports 48b.

In the connecting structure in each connecting part 109, for example a long hole is formed in an outer peripheral face of the connecting part 109, and the annular space 110 and the exhaust discharge port 48b communicate via this long hole. Incidentally, the long hole has a length at least at about 90° when seen at an angle of circumference on the outer peripheral face of the connecting part 109. The connecting part 109 rotates integrally with the tilt shaft 73. In this case, a shield member 109a or the like shaped along the circular shape of the long hole can be provided on the exhaust discharge port 48b for example, so that the exhaust does not leak out of the long hole.

The exhausts introduced into the annular spaces 110 of the connecting parts 109 once pass discharge passages 111 and merge in an exhaust merging part 112, as illustrated by arrows in FIG. 20 and FIG. 21. Then the exhaust passes through inside the drive shaft case 83 thereafter and further through the gear case 87 to be discharged into the water via the inside of a boss portion of the propeller 98. In the discharge passage 111 formed as described above, the exhaust can be discharged efficiently by well-balanced distribution on the left and right sides from the pair of exhaust discharge ports 48b of the discharge guide pipe 48. Further, by discharging finally into water from the inside of the boss portion of the propeller 98, exhaust noise can be suppressed and thus a large silencer or the like is not necessary.

Cooling System

The engine 28, the motor generator 29, or the like constituting the power unit generates heat when operating. There is provided a heat exchanger for cooling these members, and coolant is supplied to the respective parts from the heat exchanger, which flows back to the heat exchanger after being used.

Figure 30:
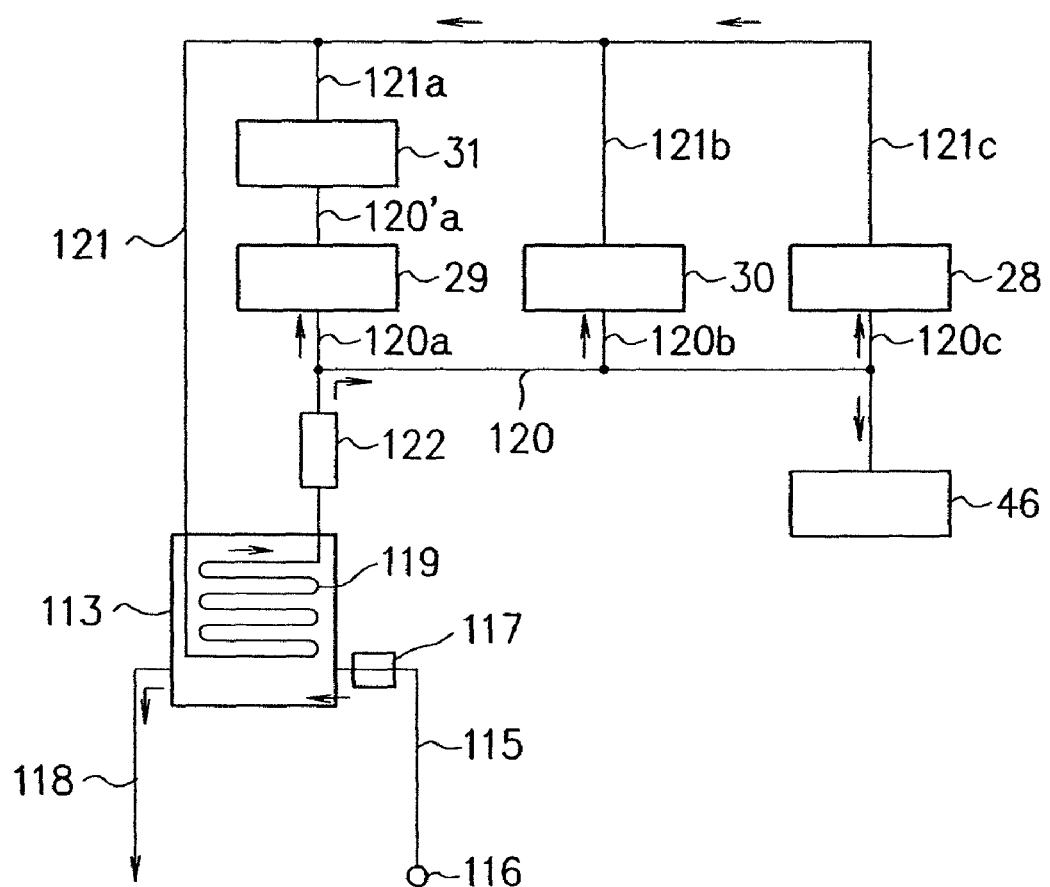
FIG. 30 is a schematic diagram illustrating a structure example of a cooling system in the power unit according to the embodiment of the present invention.

In this embodiment, as illustrated in FIG. 12 and the like, a heat exchanger 113 is disposed and supported via a bracket 114 on a front side of the motor generator 29. Incidentally, FIG. 30 schematically illustrates the cooling system with the heat exchanger 113.

To the heat exchanger 113, a seawater drawing pipe 115 for drawing seawater or freshwater (hereinafter simply referred to as seawater) is connected, and this seawater drawing pipe 115 is vertically suspended from a front bottom portion of the casing 11. On a lower end of the seawater drawing pipe 115, there is provided a seawater intake port 116, and seawater is taken in via this seawater intake port 116. Incidentally, the seawater intake port 116 projects downward from the boat bottom 3. In the casing 11, a motor-driven drawing pump 117 for drawing seawater is disposed at an appropriate position in the middle of the seawater drawing pipe 115 (see FIG. 12, FIG. 15, and the like). By this drawing pump 117, seawater is drawn up and supplied to the heat exchanger 113. The seawater in the heat exchanger 113 after use passes through a drain pipe 118 illustrated in FIG. 13 (or FIG. 14) to be drained. This drain pipe 118 is drawn as illustrated in FIG. 13 from the heat exchanger 113 and joins the above-described exhaust passage 111 to be drained.

In the heat exchanger 113, a heat exchange pipe 119 is drawn along a predetermined path, and this heat exchange pipe 119 connects at one end to a coolant supply pipe 120, and at the other end to a coolant circulating pipe 121. The coolant supply pipe 120 (120a to 120c) is connected to each of the motor generator 29 (including the case of an indirect coolant supply pipe 120a' for the inverter 31), the battery 30, the engine 28 and the exhaust pipe 46. Further, the coolant circulating pipe 121 (121a to 121c) is connected to each of the inverter 31, the battery 30, the engine 28, and the exhaust pipe 46. A motor-driven circulation pump 122 for circulating coolant is arranged at an appropriate position in the middle of the coolant supply pipe 120 (see FIG. 16), and this circulation pump 122 circulates the coolant through the cooling system.

In the above-described case, each of the motor generator 29, the battery 30 and the inverter 311, and further the exhaust pipe 46 has what is called a water jacket. By distributing the coolant through their water jackets, cooling is performed by a liquid cooling method. Incidentally, when coolant is supplied to the engine 28, the motor generator 29, the battery 30, the inverter 31, and the exhaust pipe as described above, a thermostat or the like may be attached to a coolant supply port of each of these water jackets, so as to supply/block the coolant according to temperatures of the coolant in the water jackets.

Here, incidentally, the drive gear 65 and the driven gear 66 always mesh with each other in the speed reducer 58, and thus lubricating oil is supplied to the inside of the casing 64. Accordingly, as illustrated in FIG. 8, FIG. 14 or the like, a motor-driven hydraulic pump 123 for supplying lubricating oil to the speed reducer 58 is disposed typically at a lower right side of the motor generator 29. A lubricating oil supply pipe 124 and a lubricating oil collecting pipe 125 connect the casing 64 of the speed reducer 58 and the hydraulic pump 123.

Further, at a left front side of the motor generator 29, as illustrated in FIG. 10, FIG. 12, and the like, a battery 127 (for low voltage) is disposed and supported via a bracket 126. Starting the engine (including restarting from an idle stop) is basically performed by the motor generator 29. The engine 28 includes an electric starter operated with this low voltage battery 127. For example, even if operation of the high voltage drive system (the battery 30, the inverter 31, the motor generator 29) has to be halted, the engine 28 can be started using the battery 127, and continuous cruising only by output of the engine is possible.

In the above-described case, the power unit of the outboard motor 10 is controlled optimally by the hybrid control unit and/or the engine control unit, and is always operated appropriately. For example, the state of charge of the battery 30 is always monitored, and a required charge amount or discharge amount is calculated in the hybrid control unit according to required current for output by the motor generator 29 so as to determine a generating power amount.

Further, depending on the state of the battery 30 and the traveling state of the boat, the second clutch 78 between the motor generator 29 and the drive unit is disengaged, and all the AC generated in the motor generator 29 is converted into DC in the inverter 31 and supplied to the battery 30.

Furthermore, depending on the state of the battery 30 and the traveling state, the AC generated in the motor generator 29 is converted into DC in the inverter 31 and supplied to the battery 30. Motive power of the engine 28 is used for both generating power in the motor generator 29 and driving the propeller.

Further, depending on the state of the battery 30 and the traveling state, electric power stored in the battery 30 is converted in the inverter from DC into AC to drive the motor generator 29. At low speed, the engine 28 stops, the first clutch 67 between the engine 28 and the motor generator 29 is disengaged, and the propulsion unit is driven only by the motor generator 29.

Further, depending on the state of the battery 30 and the traveling state, electric power stored in the battery 30 is converted in the inverter 31 from DC into AC to drive the motor generator 29. When accelerating for example, the propulsion unit is driven by both the engine 28 and the motor generator 29.

Further, depending on the state of the battery 30 and the traveling state, the motor generator 29 is disconnected from the engine 28 by the first clutch 67, and the torque generated by the propeller 98 of the propulsion unit 86 when decelerating generates AC by the motor generator 29, which is converted into DC in the inverter 31 to charge the battery.

Next, operations and effects and so on produced by the main components of the hybrid outboard motor 10 of the present invention will be described.

1) First, the engine 28, the motor generator 29, the battery 30 and the inverter 31 as main members constituting the power unit of the outboard motor 10 are housed in the casing 11, and the propulsion unit is mounted in the casing 11, which are all integrally disposed as the outboard motor 10 on the exterior of the hull.

Since the outboard motor does not occupy a space in the boat, the inboard space can be used widely. Further, since the components of the outboard motor are disposed substantially outside the hull, a maintenance operation or the like can be performed easily. Further, the outboard motor can be fixed easily at once to a stern portion without using any special device.

Further, in operation, the engine 28 is operated only in an efficient state with respect to load variations, which results in high fuel efficiency. Particularly, the engine 28 is stopped when being under a low load such as while idling, which improves fuel efficiency. Moreover, switching of reverse/neutral/forward is performed by varying the rotation direction and rotation speed of the motor generator 29, that is, performed not by a shift operation (involving a clutch and gears) as in the case of a typical internal combustion engine. Thus, forward, reverse, acceleration, and the like can be switched smoothly.

2) The motor generator output shaft 75 of the motor generator 29 is matched with the tilt axis (tilt shaft 73).

Accordingly, it is not necessary to bend the motor generator output shaft 75 and the propeller axis (propeller shaft 95) with respect to changes in tilt angle, using a universal joint or the like for example. Thus, it is not required to use additional motive power transmission mechanism or the like, which yields high mechanical efficiency and simplifies the structure lowering the product price. Further, the simplified structure can suppress occurrence of failure or the like as much as possible.

Further, when moored on the water, the vicinity of the propulsion unit 86 can be lifted up above the water surface (see FIG. 26), and thus is excellent in corrosion resistance and fouling resistance (against fouling due to seaweeds, shell fish, and the like). This improves durability and therefore extends the product life.

Moreover, if collision against a floating object on the water or a sea bottom should occur, the propulsion unit 86 can be flipped up in the tilt direction, so as to alleviate the collision energy (see FIG. 24, FIG. 25, and the like).

Further, since the motor and so on are not disposed in the propulsion unit 86 including the gear case 87, the propeller 88, and so on to be immersed in water, the portion of the propulsion unit 86 to be immersed in water is small. This reduces hydro-dynamic resistance (hereinafter referred to as drag), resulting in improvement of cruising performance, fuel efficiency, and the like.

Further, since a projection portion length (depth) from the boat bottom can be changed by tilting, cruising through shallow waters is possible.

Moreover, since the propelling (vertical) direction can be changed (trim function), the propelling (vertical direction) angle can be adjusted to an optimum angle for the water flow distribution around the stern, which changes due to the boat barycenter, boat bottom shape, boat speed, and the like while cruising.

3) The motor generator output shaft 75 and the drive axis (drive shaft 82) are arranged orthogonal to each other while being decelerated by bevel gears (the bevel gear 79 and the pinion 80).

Accordingly, it is not necessary to bend the motor generator output shaft 75 and the propeller axis with respect to changes in steering angle, using a universal joint or the like for example. This therefore yields high mechanical efficiency and simplifies the structure lowering the product price. Further, the simplified structure can suppress occurrence of failure or the like as much as possible.

Further, in the propulsion unit 86, the weight of a part located farthest from the tilt axis (such as the gear case 87, the propeller 88, or the like) does not become large, so the inertial mass of the movable part around the tilt axis does not become large. Accordingly, when it collides with a floating object on the water or a sea bottom, the unit flips up about the tilt axis, and the energy of impact to be absorbed becomes practically small. Therefore, a small shock absorbing device is needed, and thus the entire outboard motor can be made lightweight at a low price. Moreover, the tilt angle can be set large.

4) The drive axis and the steering axis are matched.

This allows to have a large steering angle.

Further, it is not necessary to bend the motor generator output shaft 75 and the propeller axis with respect to changes in tilt angle, using a universal joint or the like for example. This therefore yields high mechanical efficiency and simplifies the structure lowering the product price. Further, the simplified structure can suppress occurrence of failure or the like as much as possible.

Further, when steering is performed, a relative positional relationship does not change between the drive axis and the propeller axis or between the drive axis and the motor generator output shaft. Thus, motive power can be transmitted with a simple structure, resulting in high mechanical efficiency.

5) The drive axis is arranged in a vertical direction orthogonal to the propelling (propeller) axis, and the both of them are decelerated by bevel gears (the bevel gear 92 and the pinion 93).

Accordingly, from a relatively high rotation speed with high mechanical efficiency in the motor generator 29, deceleration is performed by two stages of the speed reducer (intermediate speed reducer) between the motor generator axis and the drive axis and the speed reducer (final speed reducer) between the drive shaft and the propeller shaft. Thus, a large total speed reduction ratio can be set, and deceleration to a relatively low rotation speed with high propelling efficiency of the propeller 88 is possible. Further, the final speed reducer can be made small, and thus the drag of the portion to be immersed in water does not increase.

6) The second clutch 78 which can be controlled to hybrid control unit is disposed between the motor generator 29 and the intermediate speed reducer 81.

Thus, while the propulsion unit 86 is kept stationary, the motor generator 29 can be driven by the engine 28 to make it operate as a generator to generate electric power. In this case, the generation efficiency is high because the propulsion unit 86 is stationary.

7) The crank shaft of the engine 28 is arranged orthogonal to the traveling direction of the boat (what is called a lateral internal combustion engine arrangement structure).

Accordingly, the engine does not extend in the upward and downward direction and in the forward and backward direction, and thus the entire package of the outboard motor can be made compact.

Further, the barycenter of the propulsion unit 86 is not separated largely rearward from the boat, which allows easy transition to a planing state.

8) The motor generator axis is arranged orthogonal to the traveling direction of the boat (what is called a lateral motor arrangement structure).

Thus, the entire package of the outboard motor can be made compact.

Further, also in this case, the barycenter of the propulsion unit 86 is not separated largely rearward from the boat, which allows easy transition to a planing state.

9) The crank shaft of the engine 28 and the first (first stage) speed reducer input shaft (input shaft 59) are matched. Moreover, the first speed reducer output shaft and the motor generator axis are matched. Further, the crank shaft of the engine 28 and the first speed reducer input shaft are coupled via the universal joint 57. Furthermore, the first clutch 67 which can be switched to engage/disengage by the hybrid control unit is provided between the universal joint 57 and the first speed reducer input shaft.

Thus, transmission of vibration of the engine 28 to the motor generator 29 can be prevented. For restarting after what is called stop of idling, when the engine 28 is started by the motor generator 29, a delay in starting of the engine is small because the generator for starting (motor generator 29) is arranged closely to the engine 28.

Further, the engine 28 and the motor generator 29 are separated from the drive unit (propulsion unit 86). As compared to a conventional outboard motor in which a drive unit and an internal combustion engine are integrated, the weight and inertial moment of the drive unit becomes smaller. Thus, the (hydraulic) device needed for tilting can be made small.

Moreover, when the drive unit is tilted or steered, the posture of the engine 28 does not change, and thus cooling and lubrication of the engine 28 can be performed simply and appropriately. Therefore, for example, an internal combustion engine for automobile can be used.

Further, by appropriately selecting and using the first clutch 67 and the second clutch 78, typically the following four operation modes can be selected.

(A) First Clutch "Engaged" and Second Clutch "Engaged" State

The propeller 88 is driven (acceleration or heavy load state) by the engine 28 and the motor generator 29, or the motor generator 29 is in a power generating state (battery is in a low charged state) while the propeller 88 is driven by the engine 28.

(B) First Clutch "Engaged" and Second Clutch "Disengaged" State

The boat is stationary, and charging is performed by the motor generator 29 (battery is in a low charged state) or the engine 28 can be started by the motor generator 29.

(C) First Clutch "Disengaged" and Second Clutch "Engaged" State

Propelling by the motor generator 29 or energy regeneration (stopping engine) during deceleration can be performed.

(D) First Clutch "Disengaged" and Second Clutch "Disengaged" State

This is a non-operating state.

10) The engine 28 and the motor generator 29 are covered by the watertight casing 11.

Thus, corrosion resistance and fouling resistance for the engine 28, the motor generator 29, and so on can be improved.

11) There is provided a coupling member for fixing the watertight casing 11 and the hull 1

Thus, the entire outboard motor including the engine 28 and the motor generator 29 is assembled integrally. Incidentally, regarding this point only, it is what is called an all-in-one or pre-assembled type, similarly to conventional outboard motors. Thus, it can be fixed to the hull 1 easily, and it is not necessary to adjust relative positions of the respective component members.

12) Operations and effects by the above-described all-in-one type can be achieved by the structures listed below.

(A) Tilt bearings are provided for the drive unit in the watertight casing 11

(B) A fixed end (the base end 99a of the power trim tilt 99) of the hydraulic drive device for tilting the drive unit is provided in the watertight casing 11.

(C) Fixed ends (the steering fixing brackets 103) for the drive device for steering the drive unit is provided in the watertight casing 11.

(D) The inverter 31 for converting the current of the AC generator (motor generator 29) into DC, that is, the inverter 31 for converting DC from the battery (battery 30) into AC is provided in the watertight casing 11.

With each one of these structures, the entire outboard motor including the engine 28 and the motor generator 29 are assembled integrally and can be fixed to the hull 1 easily, and it is not necessary to adjust relative positions of the respective component members.

13) Combustion air for the engine 28 disposed in the watertight casing 11 is supplied via the intake air pipe (the intake pipe 42) disposed via the through hole opened in the casing 11 and the transom board 2 of the hull 1. In this case, an open end on the inboard side of the air pipe is placed in a cabin provided in the hull that will not be exposed directly to waves, splashes, rain, and the like.

In a conventional outboard motor, combustion air in the internal combustion engine provided in a cover (cowling) is taken in via an air intake port of the cover. Thus, a negative pressure is generated in the cover, and besides the air, it is difficult to prevent entrance of water (splashes) into the cover. In this point, by taking in air from a cabin in the hull that is not exposed directly to waves, splashes, rain waters, and the like similarly to inboard motors, inboard-outdrive motors, and the like, a negative pressure is not generated in the watertight casing 11, and entrance of water (splashes) into the casing 11 can be prevented.

14) To draw air for ventilation into the watertight casing 11, the ventilation air pipe disposed via the through hole bored in the casing 11 and the transom board 2 of the hull 1 is provided. An open end on the inboard side of this ventilation air pipe is placed in a cabin provided in the hull that is not exposed directly to waves, splashes, rain, and the like. Further, a ventilation exhaust discharge port is led to the outside via a labyrinth from the casing 11.

Ventilation in the watertight casing 11 is possible. By keeping the pressure in the watertight casing 11 at positive pressures, entrance of water (splashes) into the watertight casing 11 can be prevented.

15) The lower end of the watertight casing 11 is located higher than the boat bottom 3.

Thus, the watertight casing 11 itself receives water that flows to rise from the lower end of the transom board 2 (boat bottom 3), and thus there is produced an effect to uplift the stern of the hull 1, which facilitates transition to planing.

16) The upper end of the watertight casing 11 is located at a height equal to or lower than the upper end of the transom board 2.

Accordingly, the vicinity of the stern portion, particularly the rear portion is practically released, which has advantages such as facilitating boarding or getting off the stern portion from a pier, or the like and facilitating pulling in of a net, a caught fish, or the like via the stern, for example. In addition, conventionally the space around the stern portion is occupied by a tall outboard motor. Releasing the rear side of the stern remarkably improves usability and user friendliness of the outboard motor.

17) The upper face portion of the watertight casing 11 is substantially flat.

This enables to match designs of the hull 1 and the propulsion unit (watertight casing 11). Incidentally, it is not easy in general to strike a balance between an outboard motor design and a boat design.

18) The upper portion of the watertight casing 11 is openable/closable.

Maintenance of each part (engine/motor generator/inverter, or the like) of the power unit can be performed quite easily and appropriately. Although depending on the contents of maintenance operations, conventionally, maintenance operations have to be performed in general after the outboard motor is demounted from the hull and the exterior part (cover) is removed.

19) In the watertight casing 11, for the engine 28, the motor generator 29, the battery 30, and the inverter 31, the heat exchanger is provided for exchanging heat of the coolant for them and the seawater for cooling. That is, the motor generator 29 and the inverter 31 are water cooled type.

The seawater for cooling is not directly introduced to the insides of the engine 28, the motor generator 29, the inverter 31, and so on, and thus the corrosion resistance can be improved drastically for the insides in particular of these devices or machines. Incidentally, regarding the internal combustion engine, it is substantially similar to inboard motors and inboard-outdrive motors, but outboard motors basically take in seawater directly and have a problem of corrosion resistance.

20) The motor-driven drawing pump 117 for drawing in seawater for cooling in the watertight casing 11 is provided.

In a conventional outboard motor, seawater is drawn in by a mechanical pump placed on a drive shaft, when the drive shaft is reversed as it is, drawing in and out of the pump reverses, and thus it is not applicable for a propulsion unit of the type that drives the boat backward by reversing the motor (drive shaft). Further, in the case of a mechanical pump, the amount of drawing in is determined in proportion to the rotation speed of the drive shaft (that is, the internal combustion engine). On the other hand, adopting the motor-driven pump enables to pump only the amount of cooling water that corresponds to the amount of heat generated depending on the load (throttle opening when the internal combustion engine is a gasoline engine) and the rotation speed, which avoids waste and is highly efficient.

21) In the watertight casing 11, the motor-driven circulation pump 122 is provided for circulating coolant between the engine 28, the motor generator 29, the battery 30, and the inverter 31 and the heat exchanger 113.

A mechanical pump in an inboard-outdrive motor or the like circulates an amount of coolant in proportion to only the rotation speed of the drive shaft (internal combustion engine), and only a required amount is bypassed using a thermostat or the like. On the other hand, adopting the motor-driven pump enables to circulate only the amount of coolant that corresponds to the amount of heat generated depending on the load (throttle opening when the internal combustion engine is a gasoline engine) and the rotation speed, which avoids waste and is highly efficient.

22) The through hole 27 is formed for inserting cords or cables 26 connecting devices or instruments or members in the casing 11 and a steering device on the hull 1 side electrically or mechanically.

The cables and the like are not exposed in the hull 1 or in the vicinity of the propulsion unit 86, which is quite excellent in safety, arrangement, design, and the like.

23) The engine 28 is a gasoline engine.

Based on an engine for a four-wheel vehicle which is widely mass produced, a low-price propulsion unit can be provided.

24) The engine 28 is a diesel engine.

Similarly to the above-described case, based on an engine for a four-wheel vehicle which is widely mass-produced, a low-price propulsion unit can be provided.

25) The catalyst unit 47 is provided in the exhaust passage.

Unlike conventional outboard motors, the exhaust passage can be provided independently outside the main body, and the catalyst can be placed easily. An exhaust gas can be purified appropriately and efficiently.

26) The exhaust passage is led to the vicinity of the propeller shaft via the gear case 87, and an exhaust gas is finally discharged into water.

Similarly to the case of a normal inboard motor, inboard-outdrive motor or outboard motor, quietness with respect to exhaust noise can be ensured.

27) The water jacket is provided surrounding the exhaust passage (downstream of the catalyst unit) in the watertight casing 11.

The degree of increase of the ambient temperature in the watertight casing 11 by radiation from the exhaust passage can be suppressed.

28) The lower face of the watertight casing 11 has a shape recessed in the middle (saddle shape), and in this recessed portion 18 the drive unit including the tilt axis movable part is housed.

The recessed portion 18 is set to a position where the drive unit can be housed, and the engine 28 is housed in one of box portions on both sides of the recessed portion being the center of symmetry, and the motor generator 29, the battery 30, the inverter 31, and so on are housed in the other of the box portions. Thus, the entire outboard motor has a well-balanced, quite compact shape or form.

29) In the recessed portion 18 of the watertight casing 11, a guide portion or the guide 19 for supporting a lateral direction thrust of the swivel bracket 84 is provided.

The lateral direction thrust is supported by the recessed portion 18 of the casing 11, and thus the rigidity as the whole is high, and a large lateral thrust can be supported by a simple shape. In this case, the side faces of the recessed portion 18 are used effectively, and no special structural member is required. Specifically, a quite simple structure is required such that the guide 19 with high slidability is attached to the side walls 18*b* of the recessed portion 18 to allow smooth sliding with the swivel bracket.

30) A wall portion is provided on the front side of the recessed portion 18 of the watertight casing 11 (the recessed portion 18 is provided not in the entire lower face but only in the rear side), and the entire hydraulic (or electrical) drive device for rotating the swivel bracket 84 about the tilt axis is disposed outside the watertight casing 11. By such disposition, as compared to the case of connecting the inside and outside of the watertight casing 11, the watertight structure of the casing 11 can be simplified.

31) The tilt axis is set at a position located rearward or downward from the drive shaft connecting the engine 28 and the motor generator 29.

Inertial moment around the tilt axis can be made small, and the force amount necessary for tilting can be made substantially small. Shock absorbing force to be required can be made small. An escape part for avoiding interference with the tilt movable part can be made small, and the whole body can be made compact.

32) The hybrid control unit (controlling the motor generator 29, the inverter 31, the clutches and the like) and the engine control unit are provided in the watertight casing 11.

The hybrid system is packaged as one complete unit in the watertight casing 11, and thus fixing to a boat or the like can be performed quite simply and appropriately. Thus, the all-in-one characteristic that is an excellent characteristic of the outboard motor can be ensured similarly.

33) Separately from the energy storage device (high voltage battery 30) connected to the motor generator 29 and the inverter 31, the low voltage battery 127 for engine control is provided in the watertight casing 11.

The engine 28 can be operated by a popular type (generally mass produced) control unit, which practically allows cost reduction.

Now, the gist of the present invention resides in that, in the above-described hybrid outboard motor 10, particularly the casing 11 is formed as a watertight case in a substantially rectangular parallelepiped shape with a left-right width direction being a longitudinal direction. The case has at least the front face portion 11a coupled to the stern portion, and the substantially flat upper face portion 11b at a substantially same height as the top portion 2a of the stern portion.

The casing 11 formed typically as a rectangular parallelepiped case is disposed so that the longitudinal direction of the rectangular parallelepiped is along the beam direction, and is mounted within the range of the boat width of the stern portion without extending in the forward and backward direction of the hull 1. Note that in the case of what is called an RIB boat as illustrated in FIG. 1A and the like, the inside of the tubes disposed on both sides of the hull 1 is the substantial range of the boat width, and the casing is made to fit within the range of such a boat width. In this case, by the upper face portion 11b of the casing 11, namely, the upper surface of the cover 13 being made flat and by the casing being made to fit within the boat width of the hull 1, the outboard motor 10 mounted on the hull 1 is integrated with the hull without giving a sense of incompatibility. Thus, an excellent exterior design effect is exhibited, and a novel form can be achieved.

As already described, a conventional outboard motor is mounted in the form covering an inside upper part of the hull 1 from the stern portion as illustrated in FIG. 1B, and thus the vicinity of the stern becomes a dead space, that is, it has a practical problem of not allowing boarding/getting off or the like using this space. According to the present invention, in addition to the above-described design effect, the vicinity of the stern that has conventionally been a dead space is released since it is not mounted in the form covering the stern portion. Then it is possible to allow passing people and materials smoothly as illustrated in FIG. 1A using this released space. Thus, in other words, excellent effects are exhibited in terms of both function and design as an extension of the deck of the boat.

Further, the upper face portion 11b of the case of the casing 11 is formed as the cover 13 that is openable/closable with respect to the casing body 12 and is provided with a seal member which keeps the casing body 12 and the cover 13 watertight along closed portions thereof when closed.

With the casing 11 being openable/closable, a maintenance operation inside the casing 11 can be performed easily and appropriately. Further, when the cover 13 is closed, the seal 17 as the seal member ensures the highly watertight structure of the casing 11, and thus high durability with respect to the power unit in the casing 11 can be maintained.

Further, the recessed portion 18 is provided in a middle portion in the beam direction of the casing 11 and lower than the upper face portion 11b and is formed forward from the rear face side of the casing 11. The propulsion unit 86 including the screw (propeller 88) is disposed in this recessed portion 18.

By providing the recessed portion 18 in the position where the propulsion unit 86 can be housed and disposing the main component members of the power unit on both sides of this recessed portion 18 in a well-balanced manner, a quite compact structure can be achieved.

Further, the bottom face portion 11e of the casing 11 is set reasonably higher than at least the boat bottom of the hull 1.

By receiving a water flow rising from the boat bottom 3 in the vicinity of the stern by the bottom face portion 11e of the casing 11, the effect to uplift the stern side is obtained, which allows smooth transition to planing.

Further, the power unit is disposed along the beam direction in the case of the casing 11, and the component members of the power unit are disposed symmetrically on the both sides of the recessed portion in a balanced manner.

By disposing the main component members of the power unit in a well-balanced manner, they can be disposed quite compactly with high space efficiency.

Further, a boat on which the hybrid outboard motor 10 of the present invention is mounted is integrated with the outboard motor 10 without giving a sense of incompatibility, and excellent effects are exhibited in terms of both function and design as an extension of the deck.

Thus, according to the present invention, the hybrid outboard motor 10 is achieved which is formed quite compactly and can be mounted on a boat integrally and compactly. At this time, while solving various problems and the like which conventional outboard motors have, excellent operations and effects can be exhibited when mounted on a boat.

Furthermore, in the present invention, particularly in the above-described hybrid outboard motor 10, the engine 28 constituting the power unit is disposed on one of the left and right sides of the casing 11 in a substantially rectangular parallelepiped shape with a left-right width direction being a longitudinal direction, and the motor generator 29 and the battery 30 for driving the motor generator are disposed on the other side of the left and right sides of the casing 11.

The engine 28 and the motor generator 29 and the battery 30 which account for a large portion of the weight of the power unit are disposed in parallel on the left and right sides in the casing 11, the engine being disposed on the right side and the motor generator 29 and the battery 30 being disposed on the left side in this embodiment. By thus disposing substantially symmetrically about the center in the casing 11, the barycenter of the entire power unit system becomes close to the side of the hull 1 (transom board 2). This inhibits extension of the outboard motor 10 in the forward and backward direction. Moreover, the crank shaft of the engine being not arranged along the vertical direction inhibits extension in the upward and downward direction, particularly in the upward direction, and the component members of the power unit are housed compactly in the casing 11.

Further, in the present invention, the crank shaft 33 side of the engine and the input shaft 59 side of the speed reducer 58 attached to the motor generator 29 are coupled via a coupling mechanism, namely, the universal joint 57 disposed along the beam direction.

As described above, when the main component members of the power unit are disposed in parallel on the left and right sides, it is possible to dispose them separately in a state of keeping a favorable coupling relationship for rotational movement between the left and right sides, and dispose the engine 28, the motor generator 29, and so on as power unit component members in a well-balanced manner.

In addition, the inverter 31 is disposed at a substantially middle in the beam direction of the casing 11 or near the other side (left side) of the casing. Including this inverter 31, the components are disposed on the left and right sides of the casing 11 with a well-balanced weight distribution.

In the present invention, more specifically, the crank shaft 33 of the engine 28 and the input shaft of the motor generator 29 are disposed substantially horizontally along the beam direction.

The power transmission path between the engine 28 side and the motor generator 29 side is set horizontally in the beam direction, and thereby the main component members of the power unit can be disposed close to the transom board 2. By such an arrangement structure, the barycenter position of the entire system becomes closer to the transom board 2. Therefore, on the water, the posture of the hull 1 in which the outboard motor 10 is mounted is suppressed from declining toward the stern as much as possible, thereby allowing quite smooth, easy and appropriate transition to planing.

Further, in the present invention, the motor generator 29 has the motor generator output shaft 75 disposed in parallel with the universal joint 57, the tilt shaft 73 as the tilt axis is set on the extended line of this motor generator output shaft 75, and the propulsion unit 86 including the screw 88 is suspended from this tilt axis at a middle in the beam direction.

Using a space between the engine 28 and the motor generator 29 and the battery 30 which are disposed separately on the left and right sides in the casing as described above, the propulsion unit 86 is arranged at the center in the beam direction. Such an arrangement structure allows to house the component members of the power unit more compactly in the casing 11.

Thus, according to the present invention, a novel hybrid outboard motor which has not existed hitherto can be achieved by favorably and effectively arranging and structuring plural devices and units as component members of the power unit in a limited space of the casing 11, while particularly achieving compactness, high performance, and the like.

Figure 31:
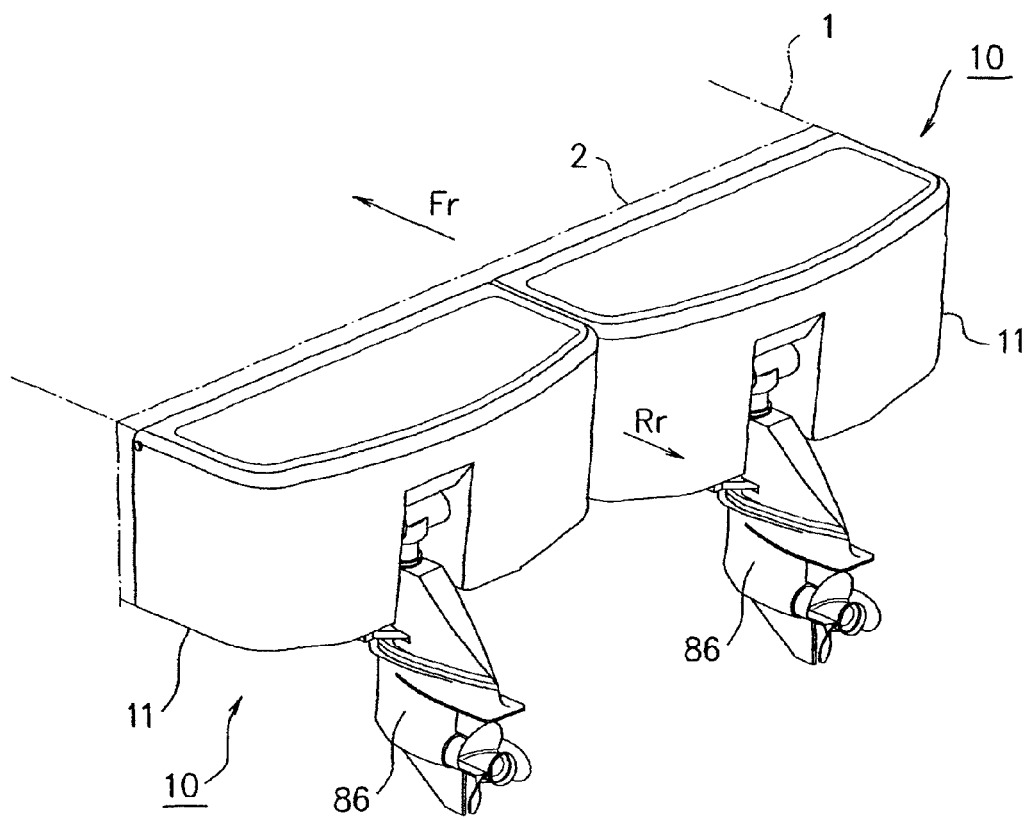
FIG. 31 is a perspective view illustrating an example of a modified form of the hybrid outboard motor according to the present invention.

Here, an example of mounting the single unit of the hybrid outboard motor 10 on a boat has been described in the embodiment as above, but it is not limited to the single unit and, for example, plural units thereof may be mounted in parallel as illustrated in FIG. 31.

In FIG. 31, the transom board 2 of the hull 1 is used to mount two hybrid outboard motors 10 in the form of parallel arrangement on the left and right sides. For example, such as when higher output and higher speed are required, mounting of plural outboard motors 10 as such can effectively correspond to achieving higher speed or the like.

Figure 32:
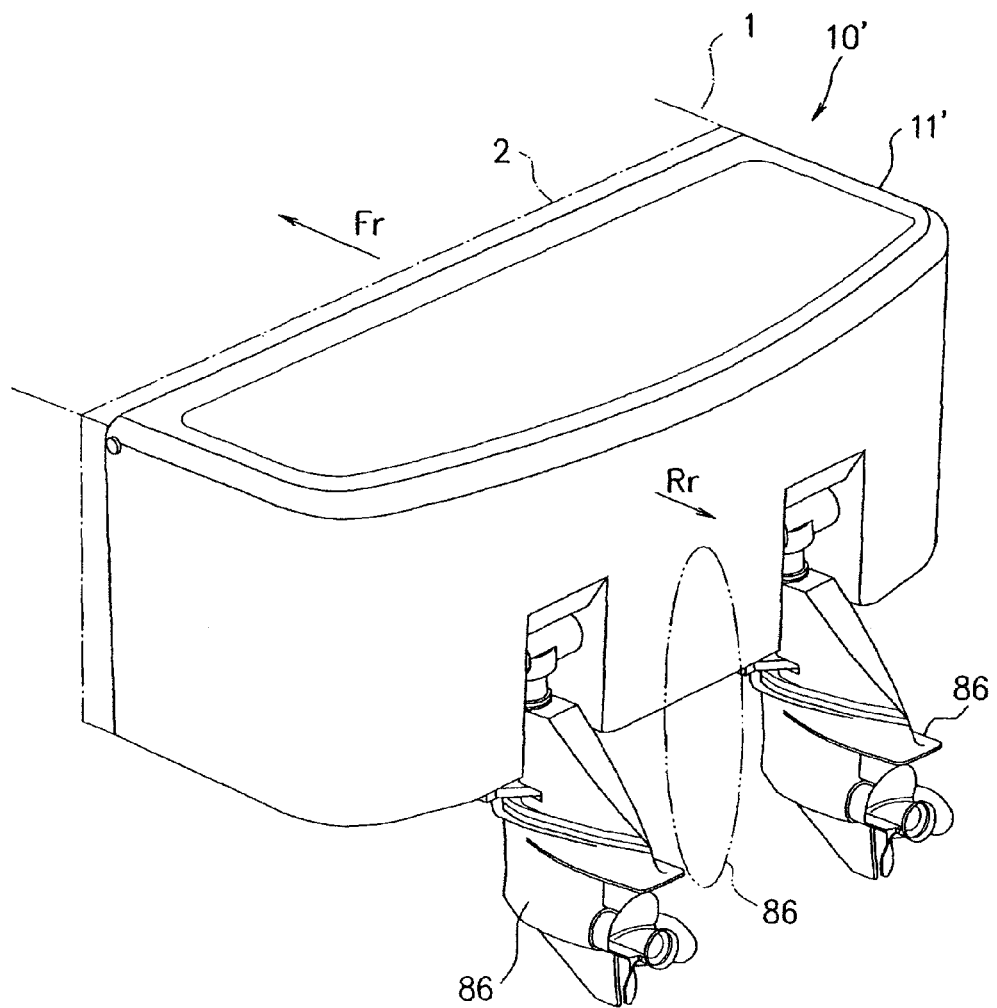
FIG. 32 is a perspective view illustrating an example of a modified form of the hybrid outboard motor according to the present invention.

Furthermore, two propulsion units 86 disposed with a predetermined distance therebetween can also be provided in a single outboard motor 10' as illustrated in FIG. 32. For example, such as when the boat width is larger than that in the above-described embodiment, the tilt shaft 73 is further extended from the motor generator 29 side to the engine 28 side in a casing 11', and the second propulsion unit 86 is suspended from this extended portion. Also in this case, it is possible to effectively correspond to achieving higher speed or the like. Furthermore, in FIG. 32, it is also possible to mount a third propulsion unit 86 in parallel along the beam direction.

In the foregoing, the present invention has been described with the embodiment, but the present invention is not limited to this embodiment, and changes and the like may be made within the scope of the present invention.

The case of the casing housing the power unit in the above-described embodiment is a rectangular parallelepiped as a typical example, but is not limited to the rectangular parallelepiped in the strict sense. Specifically, as illustrated in FIG. 2 and the like, the vicinities of rear portions of the casing 11 (left and right corner portions of the rear face portion 11d) may have a curved shape, or both left and right sides of the bottom face portion 11e may be formed in a moderately tapered shape. Further, a form having a most integrated shape in relation with the boat on which the outboard motor is to be mounted can be adopted.

Furthermore, although specific numeric values are used in describing the above-described embodiment, the embodiment is not limited to these values, and the values can be changed appropriately as necessary within the range of the present invention.

Moreover, although the above-described embodiment is described with an example in which the engine 28 as a component member of the power unit is disposed on the right side and the motor generator 29, the battery 30, and so on are disposed on the left side, these members may be disposed in a relationship having reversed left and right sides with the above-described embodiment, in other words, the engine 28 may be disposed on the left side and the motor generator 29, the battery 30, and so on may be disposed on the right side. Also in this case, operations and effects similar to those of the above-described embodiment can be obtained.

According to the present invention, the casing is disposed so that the longitudinal direction of the rectangular parallelepiped is along the beam direction without extending to the inside (upper side) of the hull, and thus the outboard motor is mounted compactly. In this case, by the upper face portion of the casing, namely, the upper surface of the cover being made flat, the outboard motor mounted on the hull is integrated with the hull without giving a sense of incompatibility. At the same time, the vicinity of the stern that has conventionally been a dead space is released, thereby creating a passing space for people and materials.

With the casing being openable/closable, a maintenance operation inside the casing can be performed easily and appropriately. Further, when the cover is closed, the seal as the seal member ensures the highly watertight structure of the casing, and thus high durability with respect to the power unit in the casing can be maintained.

By providing the recessed portion in the position where the propulsion unit can be housed and disposing the main component members of the power unit on both sides of this recessed portion in a well-balanced manner, a quite compact structure can be achieved.

Further, the bottom face portion of the casing is set reasonably higher than at least the boat bottom of the hull. By receiving a water flow rising from the boat bottom in the vicinity of the stern by the bottom face portion of the casing, the effect to uplift the stern side is obtained, which allows smooth transition to planing.

Moreover, by disposing the main component members of the power unit in a well-balanced manner, they can be disposed quite compactly with high space efficiency.

Further, according to the present invention, the internal combustion engine and the electric motor serving also as a generator and the electric energy storage device which account for a large portion of the weight of the power unit are disposed in parallel on the left and right sides in the casing. Thus, the barycenter of the entire power unit system becomes close to the side of the hull (stern portion). This inhibits extension of the outboard motor in both the forward and backward direction and the vertical direction, particularly in the upward direction, and the component members of the power unit are housed compactly in the casing.

Further, when the main component members of the power unit are disposed in parallel on the left and right sides, it is possible to dispose them separately in a state of keeping a favorable coupling relationship for rotational movement between the left and right sides, and dispose the internal combustion engine, the electric motor serving also as a generator, and so on as power unit component members in a well-balanced manner.

Furthermore, the power transmission path between the side of the internal combustion engine and the side of the electric motor serving also as a generator is set horizontally in the beam direction. In this case, using a space where the internal combustion engine and the electric motor serving also as a generator are disposed separately, the propulsion unit is arranged at the center in the beam direction. Such an arrangement structure allows to arrange the main component members of the power unit appropriately and efficiently in a limited space.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A hybrid outboard motor, comprising:
   a casing provided to a stern portion of a boat;
   a power unit housed in the casing; and
   a screw disposed outside the casing, the screw being driven by the power unit, wherein
   the casing is watertight and in a substantially rectangular parallelepiped shape having a left-right width direction in relation to a direction from a stern side toward a bow side of the boat, the left-right width direction being a longitudinal direction of the substantially rectangular parallelepiped shape and a direction of a beam of the boat,
   at least a front side face portion of the casing is coupled to the stern portion,
   a substantially flat upper face portion of the casing is at a substantially same height as a top portion of the stern portion, and
   the power unit includes an internal combustion engine, and an electric motor provided beside the internal combustion engine in the direction of the beam of the boat.

2. The hybrid outboard motor according to claim 1, wherein
   the upper face portion of the casing is formed as a cover that is openable/closable with respect to a casing body and is provided with a seal member which keeps the casing body and the cover watertight along closed portions thereof when closed.

3. The hybrid outboard motor according to claim 1, further comprising:
   a recessed portion which is provided in a middle portion of the casing in the direction of the beam of the boat and lower than the upper thee portion and is formed forward from a rear face of the casing; and
   a propulsion unit including the screw and disposed in the recessed portion.

4. The hybrid outboard motor according to claim 1, wherein
   a bottom face of the casing is set higher than at least a bottom surface of a hull of the boat.

5. A hybrid outboard motor, comprising:
   a casing being in a substantially rectangular parallelepiped shape having a left-right width direction in relation to a direction from a stern side toward a bow side of a boat, the left-right width direction being a longitudinal direction of the substantially rectangular parallelepiped shape and a direction of a beam of the boat;
   a power unit housed in the casing;
   a screw disposed outside the casing and being driven by the power unit;
   an internal combustion engine provided as a power source;
   an electric motor serving also as a generator, provided as another power source; and
   an electric energy storage device that drives the electric motor, wherein
   one or both of the internal combustion engine and the electric motor constitute the power unit,
   the internal combustion engine is disposed on one of the left and right sides of the casing, and
   the electric motor and the electric energy storage device are disposed on the other side of the left and right sides of the casing.

6. The hybrid outboard motor according to claim 5, wherein
   an inverter connected between the electric motor and the electric energy storage device is disposed at a substantially middle portion of the casing in the direction of the beam of the boat.

7. The hybrid outboard motor according to claim 5, wherein
   a crank shaft of the internal combustion engine and an input shall of the electric motor are disposed substantially along the direction of the beam of the boat.

* * * * *

UNITED STATES PATENT AND TRADEMARK OFFICE
CERTIFICATE OF CORRECTION

PATENT NO. : 8,333,626 B2  
APPLICATION NO. : 12/731495  
DATED : December 18, 2012  
INVENTOR(S) : Keisuke Daikoku Page 1 of 1

It is certified that error appears in the above-identified patent and that said Letters Patent is hereby corrected as shown below:

On the title page item "(73) Assignee: Suzuki Motor Corporation, Tokyo (JP)"

should correctly read as

--(73) Assignee: Suzuki Motor Corporation, Shizuoka (JP)--.

Signed and Sealed this
Thirteenth Day of August, 2013

Teresa Stanek Rea
*Acting Director of the United States Patent and Trademark Office*